US010932004B2

(12) United States Patent
Shekhar et al.

(10) Patent No.: US 10,932,004 B2
(45) Date of Patent: Feb. 23, 2021

(54) RECOMMENDING CONTENT BASED ON GROUP COLLABORATION

(71) Applicant: ADOBE INC., San Jose, CA (US)

(72) Inventors: Sumit Shekhar, Karnataka (IN); Nishant Yadav, New Delhi (IN); Anindya Shankar Bhandari, West Bengal (IN); Aditya Siddhant, Bihar (IN)

(73) Assignee: ADOBE INC., San Jose, CA (US)

( * ) Notice: Subject to any disclaimer, the term of this patent is extended or adjusted under 35 U.S.C. 154(b) by 241 days.

(21) Appl. No.: 15/414,366

(22) Filed: Jan. 24, 2017

(65) Prior Publication Data

US 2018/0213284 A1 Jul. 26, 2018

(51) Int. Cl.
*H04N 21/466* (2011.01)
*H04N 21/4788* (2011.01)
(Continued)

(52) U.S. Cl.
CPC ....... *H04N 21/4668* (2013.01); *G06F 16/437* (2019.01); *G06F 16/9535* (2019.01);
(Continued)

(58) Field of Classification Search
CPC ........... H04N 21/4668; H04N 21/4532; H04N 21/44213; H04N 21/4788; H04N 21/4826;
(Continued)

(56) References Cited

U.S. PATENT DOCUMENTS 9,172,762 B2 * 10/2015 Ruffner .............. G06Q 30/0201
9,852,214 B2 * 12/2017 Fife ......................... G06F 17/27
(Continued)

OTHER PUBLICATIONS

Christakopoulou, K., Radlinski, F., & Hofmann, K. (Aug. 2016). Towards conversational recommender systems. In Proceedings of the 22nd ACM SIGKDD International Conference on Knowledge Discovery and Data Mining (pp. 815-824). ACM.
(Continued)

*Primary Examiner* — Cynthia M Fogg
(74) *Attorney, Agent, or Firm* — Shook, Hardy & Bacon L.L.P.

(57) ABSTRACT

Embodiments are directed towards recommending and providing content to a user group for the social consumption of recommended content. Embodiments include generating an individual recommendation for the users based on user preferences of the plurality of users. A group recommendation is generated based on a combination of the individual recommendations. The group recommendation is provided to each of the plurality of users. The group may collaborate over the group recommendation. During collaboration, the group may generate a dialog that includes a discussion based on the group recommendation. Keyword and sentiment pairs, included in the dialog, are determined. The group recommendation is updated based on the keywords and sentiments. The updated group recommendation is provided to the users. In response to detecting a group consensus while monitoring the group collaboration, content associated with the group consensus is provided to the users. Providing the content enables a social content-consuming experience.

20 Claims, 12 Drawing Sheets

(51) Int. Cl.

*H04N 21/442* (2011.01)
*H04N 21/45* (2011.01)
*H04N 21/482* (2011.01)
*G06F 16/435* (2019.01)
*G06F 16/9535* (2019.01)
*G06Q 50/00* (2012.01)
*G06Q 10/10* (2012.01)

(52) U.S. Cl.

CPC ........... *G06Q 10/103* (2013.01); *G06Q 50/01* (2013.01); *H04N 21/44213* (2013.01); *H04N 21/4532* (2013.01); *H04N 21/4788* (2013.01); *H04N 21/4826* (2013.01)

(58) Field of Classification Search

CPC ......... G06F 17/30035; G06F 17/30867; G06F 16/9535; G06F 16/437; G06Q 50/01; G06Q 10/103

USPC .......................................................... 725/131

See application file for complete search history.

(56) References Cited

U.S. PATENT DOCUMENTS

2004/0003392 A1* 1/2004 Trajkovic ........... H04N 21/4661 725/10
2007/0050192 A1* 3/2007 Gutta ..................... G06Q 10/10 725/39
2012/0324498 A1* 12/2012 Scott ....................... G10L 15/26 725/14
2013/0086159 A1* 4/2013 Gharachorloo ......... G06F 16/48 709/204
2013/0287187 A1* 10/2013 Gandhe ............. H04M 3/42042 379/93.17
2014/0173642 A1* 6/2014 Vinson ............. H04N 21/44222 725/9
2015/0088593 A1* 3/2015 Raghunathan ..... G06Q 10/0633 705/7.27
2015/0207828 A1* 7/2015 Buddenbaum ...... H04L 65/1053 709/205
2015/0248651 A1* 9/2015 Akutagawa ............ G06Q 50/01 705/7.19
2015/0286842 A1* 10/2015 Mori .................. G06F 21/6245 726/30
2016/0125085 A1* 5/2016 Vasudevan .......... G06F 16/9535 707/734
2016/0171540 A1* 6/2016 Mangipudi ........ G06Q 30/0255 705/14.53
2016/0188725 A1* 6/2016 Wang ................ G06F 17/30867 707/734
2016/0255163 A1* 9/2016 Stathacopoulos ....... H04L 51/14 709/224
2016/0255170 A1* 9/2016 Gargi ................ G06Q 30/0269 709/204
2016/0286284 A1* 9/2016 Archibong .......... H04L 65/4084
2017/0251260 A1* 8/2017 Sanders ............. H04N 21/4668
2017/0329858 A1* 11/2017 Adamy ............... G06F 16/9535
2017/0372200 A1* 12/2017 Chen ........................ G06N 3/08
2018/0018569 A1* 1/2018 Roitman .................. G06N 5/04
2018/0060973 A1* 3/2018 Kapoor .................. G06Q 50/01
2018/0069821 A1* 3/2018 Peacock ................. G06Q 10/00
2018/0183739 A1* 6/2018 Foerster ................ H04L 65/602

OTHER PUBLICATIONS

Ducheneaut, N., Moore, R. J., Oehlberg, L., Thornton, J. D., & Nickell, E. (2008). Social TV: Designing for distributed, sociable television viewing. Intl. Journal of Human-Computer Interaction, 24(2), 136-154.

Nathan, M., Harrison, C., Yarosh, S., Terveen, L., Stead, L., & Amento, B. (Oct. 2008). CollaboraTV: making television viewing social again. In Proceedings of the 1st international conference on Designing interactive user experiences for TV and video (pp. 85-94). ACM.

O'connor, M., Cosley, D., Konstan, J. A., & Riedl, J. (2001). PolyLens: a recommender system for groups of users. In ECSCW 2001 (pp. 199-218). Springer, Dordrecht.

Roy, S. B., Thirumuruganathan, S., Amer-Yahia, S., Das, G., & Yu, C. (Mar. 2014). Exploiting group recommendation functions for flexible preferences. In Data Engineering (ICDE), 2014 IEEE 30th International Conference on (pp. 412-423). IEEE.

The Social TV Lab. (2012). The Social TV Lab at the Wharton School—University of Pennsylvania. Retrieved from the Internet Mar. 23, 2018 at <http://thesocialtvlab.wpengine.com/>. 9 pages.

* cited by examiner

RECOMMENDING CONTENT BASED ON GROUP COLLABORATION

BACKGROUND

In recent years, technologists have made significant advances in network bandwidth, as well as other technologies that enable simple and intuitive interaction with computing devices that are communicatively coupled via networks. Such advances have dramatically increased the ways that human users employ such networked computing devices in their daily lives. For instance, in contrast to the traditional media-broadcast model, many people now consume media via on-demand content streaming to a computing device. Furthermore, many users now communicate amongst one another, via textual, audio, and/or video data. A user may generate communicative data by employing a computer device and transmit the data over a network. Other users may receive and consume such communicative data by also employing computer devices coupled to the network. Thus, increases in bandwidth and other technologies provide users with at least the appearance of real-time communication and consumption of multimedia content.

At least due to these advances, groups of users may now participate in social or collaborative content viewing and/or listening experiences. That is, remote users within a group may enjoy the experience of consuming content, as well as communicating amongst each other in real time. However, depending on the group dynamics, it may be difficult for the group to reach a consensus regarding what content to socially view, listen to, read, play, or otherwise consume.

SUMMARY

Embodiments of the present invention are directed towards recommending and providing content to a user group, which includes multiple users, for the social consumption of the content. The various embodiments include generating an individual recommendation for each of the users. The individual recommendation for a specific user is based on user preferences for the specific user. An individual recommendation includes a ranking of the content. A group recommendation is also generated. The group recommendation is based on a combination of the individual recommendations for each of the users. The group recommendation includes a group ranking of the content. The group recommendation is provided to each of the users.

The group collaborates over the group recommendation. During the group collaboration, the group generates a dialog that includes a discussion based on the group recommendation. The group collaboration is actively monitored. Keyword and sentiment pairs, included in the dialog, are automatically determined and/or recognized. The group recommendation is updated based on at least the keywords or the sentiments of the users. The updated group recommendation is provided to each of the users. In response to detecting a group consensus while monitoring the group collaboration, content associated with the group consensus is provided to each of the users. Providing the content enables a social content-consuming experience.

DETAILED DESCRIPTION

Figure 1A:
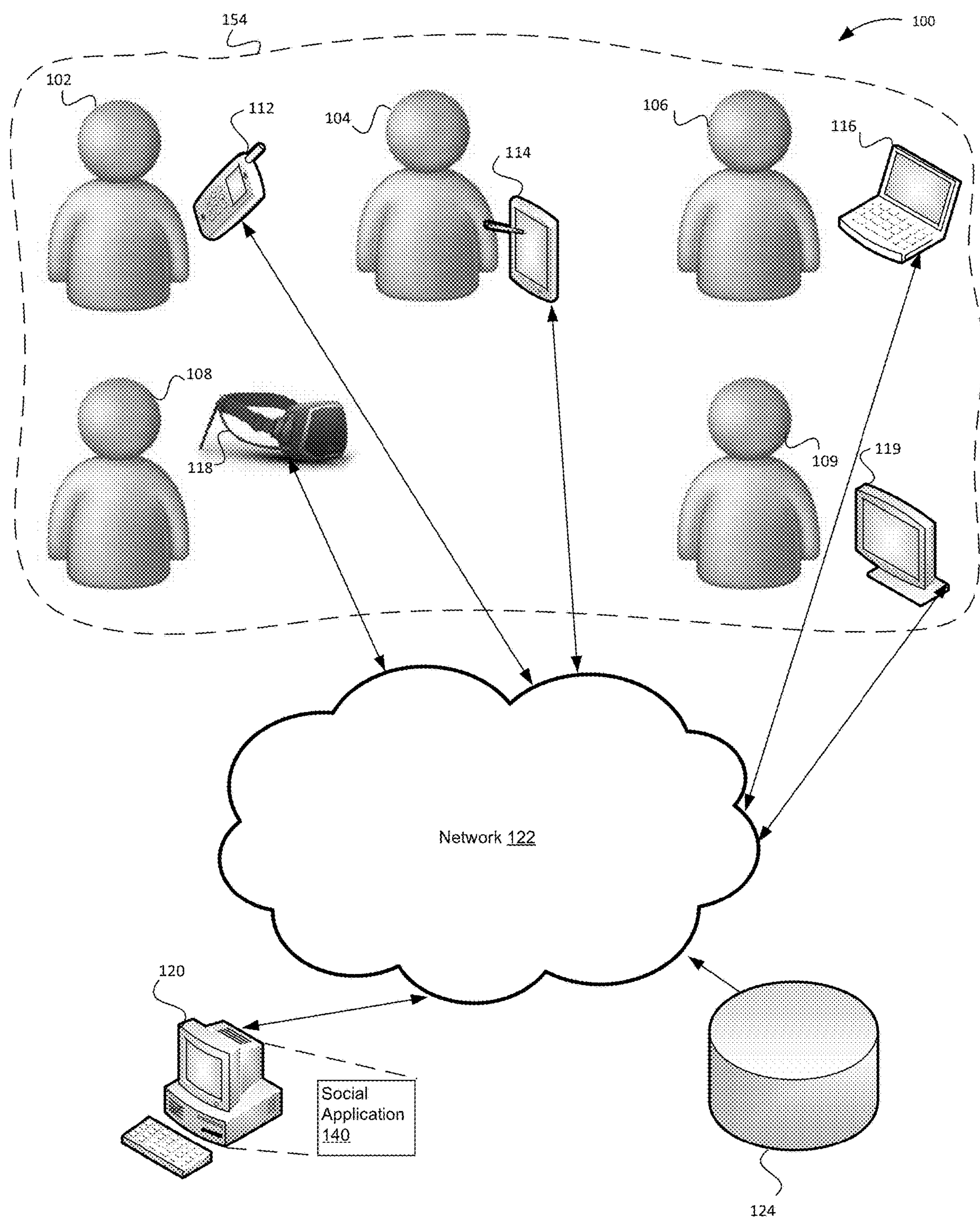
FIG. 1A illustrates a system implementing various embodiments presented herein.

Briefly stated, various embodiments are directed toward systems and methods that enable the social consumption of content. The content may be simultaneously consumed by each user included in a user group. Prior to providing the content, the various embodiments provide a group recommendation that includes identifiers for particular content (included in a set of available content) that the group as a whole may wish to consume.

The embodiments enable the users, at least a portion of whom may be remote users, to collaboratively participate in an on-going and real-time dialog about the group recommendation and the set of available content, as a whole. Based on the ongoing dialog, the group recommendation is iteratively updated. In response to determining a group consensus regarding which particular content to consume, the embodiments provide each of the users the particular content that the group collaboratively decided to consume. Thus, the systems and methods provide remote users a social experience for collaborating in the selection and consumption of on-demand content. By iteratively updating the group recommendation, the embodiments provide a natural and non-obtrusive mechanism to catalyze a group consensus, as well as resolve conflict between the users.

Many previous systems for providing recommendations for online content do not provide the social experience of collaborating in the selection and consumption of on-demand content. For instance, when recommending content, these previous systems often recommend content to a single user by considering the history of the single user's content consumption patterns. When previous systems do consider the preferences of other users, these systems often consider only the previous patterns of users considered somewhat "similar" to the single user. In contrast to the various embodiments described herein, these previous systems do not employ the real-time social collaboration of a group of users to guide content recommendations. For instance, the only feedback for updating the content recommendations, in such previous systems, may be relevance-based feedback relating to the single user's search queries. In other words, previous systems often do not consider the evolving moods and/or preferences of each user in a user group, which evolve over the course of group collaboration, as well as the dominance and influence each user has on other users to catalyze a group consensus. Thus, such previous systems often do not provide a natural and intuitive mechanism to accelerate a group consensus and resolve conflict during a group collaboration regarding what content to consume.

More specifically, and in contrast to these previous systems, the various embodiments herein provide a social platform for a plurality of remote users to collaboratively decide upon, and then simultaneously consume or even interact with on-demand content. A virtual assistant (VA) provides an initial group recommendation to the group. The VA may be a voice-enabled VA that simultaneously interacts with each of the remote users, via voice-initiated user commands.

This initial group recommendation is based on individual recommendations for each of the users included in the group. As noted above, upon being provided the group recommendation, the users may collaborate with one another via a dialog seeded by the group recommendation. The dialog may be an audio-based or video-based dialog. Thus, the dialog may be included in audio and/or video data with the embedded speech of one or more natural languages. In other embodiments, the dialog may be included in textual data in various natural languages.

The VA actively monitors the dialog between the users. Based on the dialog, the embodiments automatically and iteratively update, modify, or adapt the group recommendation. That is to say, the group recommendation is iteratively updated based on the changing moods and/or preferences of the users, as indicated by the dialog. As a group recommendation is updated, the VA iteratively provides the updated group recommendation to each user. In addition to various vocal styles, each user may select other VA options, such as frequency of receiving the updated group recommendation, format/data type (audio vs. textual updates), and the like. Accordingly, each user may tailor various embodiments with their own preferences regarding the level of presence or intrusiveness of the VA As the group collaboration continues, the dominance and/or influence of each user may affect the moods and/or preferences of each of the other users within the group. Thus, in some embodiments, the dominance of each user, as well as in a user-user influence between each pair of users is modeled based on the ongoing dialog. The modeled dominance and user-user influence of the users is employed to iteratively update the group recommendation. Additionally, aspects of the continuing dialog are employed as feedback to iteratively update the dominance and the user-user influence models, which in turn are employed as feedback to iteratively update the group recommendation. Thus, the group recommendation is iteratively adapted to conform to not only the evolving moods and/or preferences of the users, but also the evolving dominance and influence of each user, with respect to the other users. By iteratively updating and employing models of each of the users' dominance and influence with the other users, the various embodiments provide a natural and un-obtrusive mechanism to catalyze and accelerate reaching a group consensus, as well as resolving conflicts within the group.

Accordingly, the various embodiments provide a social content consuming system that provides recommendations for content based on each user of the group. The group recommendation is adapted based on an ongoing and actively monitored dialog between the users. Furthermore, the group recommendations are updated based on iteratively updated models of the dominance of each user, as well as the user-user influence between each pairs of users. Thus, the evolving moods and/or preferences of each of the users are accounted for when updating the group recommendation. The embodiments employ dialog-based feedback to update the group recommendations, such that the recommendations are consistent with current and real-time preferences of the users. Such embodiments enable a socially collaborative platform that catalyzes a group consensus regarding which content to consume, unobtrusively resolves conflicts within the group, and provides the group with a shared social experience of viewing, listening to, and/or interacting with the decided upon content.

As used herein, the term "content" may refer to any set of digital content. Such sets of digital content may include, but are not otherwise limited to video content, audio content, textual content, or other multimedia content. The content may be available for online and/or on-demand delivery. Thus, content may include sets of individual movies, television shows, online videos, musical albums, books (textual or audio), video and/or audio podcasts, blogs, or the like, as well as any combination thereof, that is available for online delivery. The content may be static or dynamic content. The content may include interactive content such as an online video or text-based games. Thus, consuming content may include viewing content, listening to content, reading content, playing an online game, or the like. In some embodiments, the content may be virtual reality (VR)- or augmented reality (AR)-related content. In such embodiments, consuming content may include being immersed in VR and/or AR content.

Although many of the embodiments discussed herein are directed towards the recommending and social viewing of movies and television shows, other embodiments are not so constrained. For instance, some of the various embodiments are directed towards recommending and providing online video games for simultaneous play. Such embodiments provide the users with an online social gaming platform. Other embodiments are directed towards the recommendation and providing of online videos, musical albums, books (textual or audio), audio/video podcasts, blogs, VR/AR content, and the like, as well as any combination thereof.

As used herein, the term "user group" or simply "group" refers to a set of users that are each employing one or more computing devices that are communicatively coupled via one or more networks. Thus, a group includes a plurality of users. Such computing devices include, but are not otherwise limited to desktop computers, laptop computers, mobile devices, wearable devices, devices specially adapted to VR and/or AR applications, such as but not limited to VR headsets, and the like. Mobile devices may include smartphones, tablets, and such. Wearable devices may include eyewear, headwear, wristwear (i.e. smart watches), and the like. In various embodiments, a computing device includes specialized "internet of things" devices, such as, but not limited to smart televisions, audio/video streaming devices, standalone VA devices, digital video recorders (DVRs), and the like. Thus, a computing device may include virtually any device that enables a user to communicate with other users via textual, audio, image, audio, VR/AR data transmitted over a network, as well as consume content delivered over a network. A generalized exemplary, but non-limiting embodiment of a computing device is discussed in conjunction with computing device 900 of FIG. 9.

As used herein, the term "dialog" refers to any communication in one or more natural languages, generated by at least one user. A dialog may be embedded in data of any form, such as but not limited to audio data, textual data, video data, and the like. Thus, an audible dialog may include speech, in one or more natural languages, embedded in and transmitted via audio data. Likewise, a dialog may include a text-based discussion, embedded in and transmitted in textual data.

Example Operating Environment

FIG. 1A depicts a system 100 implementing various embodiments presented herein. A user group, such as but not limited to user group 154, employs system 100 for the social viewing and/or consumption of content. User group 154 includes a plurality of users 102-109. Each of users 102-109 employs one or more computing devices to communicate with one another and to consume content. For instance, user 102 employs smartphone 112, user 104 employs tablet 114, user 106 employs laptop 116, user 118 employs VR headset 118, and user 109 employs smartphone 119. It should be understood that user group 154 may include fewer or more users than the five users depicted in FIG. 1A. It should also be understood that users in user group 154 may employ separate and/or different combinations of computing devices, as indicated in FIG. 1A. For System 100 includes a generalized network 122 that communicatively couples the computing devices 112-119 employed by users 102-109. Network 122 may be any communication network, including virtually any wired and/or wireless communication technologies, wired and/or wireless communication protocols, and the like. In various embodiments. It should be understood that network 122 may be virtually any network that communicatively couples a plurality of computing devices in such a way as to enables users 102-109 to communicate with one another and consume content via computing devices 112-119.

System 100 includes computing device 120. Computing device 120 may be virtually any computing device, such as but not limited to a server computing device, client computing device, and the like. Computing device 120 may be communicatively coupled to computing devices 112-119 via network 122.

As shown in FIG. 1A, computing device 120 hosts social application 140. Various embodiments of social application 140 are discussed in conjunction with FIG. 1B. However, briefly, social application 140 may provide, execute, implement, or otherwise enable any of the various embodiments discussed herein, including but not limited to the various processes, methods, and workflows discussed in conjunction with at least but not limited to FIGS. 2-7. As such, social application 140 may interact with users, such as users 102-119 via computing devices 112-119. Social application may provide group recommendations and content to computing devices 112-119. Furthermore, social application 140 may provide VA-related services to any of computing devices 112-119. For instance, when providing group recommendations, content, and VA-related services to computing devices 112-119, social application 140 may execute, at least portions of process workflows 200-700, of FIGS. 2-7 respectively.

System 100 also includes one or more database collections, such as but not limited to database collection 124, that includes one or more databases. Network 122 communicatively couples each of the databases included database collection 124 to computing devices, such as but not limited to computing device 120 and computing devices 112-119. Various embodiments of database collection 124 are discussed in conjunction with at least FIG. 1B. However, briefly, database collection 124 may store data or information that is employed to train at least a portion of the modules, components, or engines included in social application 140 via various supervised and/or unsupervised machine-learning methods or processes. Data stored in database collection 124 may be employed to generate the collaborative and/or content filters or recommendations discussed herein. Such data may be employed in generating and/or updating various individual recommendations, group recommendations, user-user influence weights, user dominance weights, and the like.

Figure 1B:
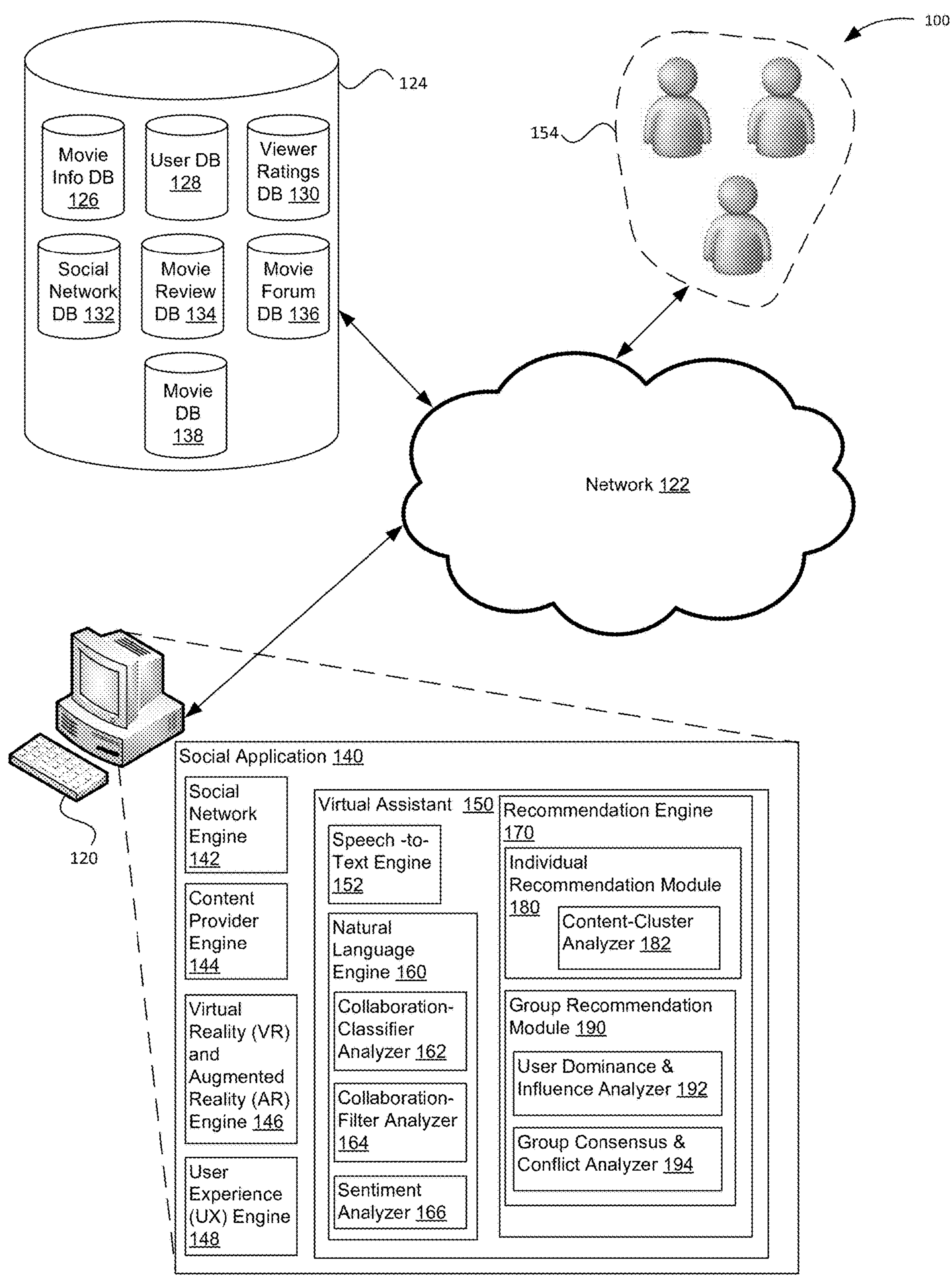
FIG. 1B illustrates additional aspects of the system of FIG. 1A.

FIG. 1B illustrates additional aspects of the system 100 of FIG. 1A. As shown in FIG. 1B, computing device 120 hosts social application 140. As discussed throughout, social application 140 may employ, access, and/or write to any of the various databases included in database collection 124. It should be understood that database collection 124 may include fewer or more databases than that shown in FIG. 1B. Additionally, database collection 124 may include separate and/or different databases than that shown in FIG. 1B, depending on the type of recommended and delivered content.

Database collection 124 may include a user database 128, which includes various user preferences discussed herein. For instance, user database 128 may include collaborative-based and content-based user preferences for at least users included in user group 154. User database 128 may include the content consuming or viewing history of users 102-109. Database collection 124 also includes a social network database 132, which includes social networking data associated with users 102-109. For instance, social network database 132 may include data for one or more social networks that include at least one of users 102-109.

In embodiments directed towards recommending and providing online movie content, database collection 124 may include various databases related to movies, such as but not limited to movie information database 126, viewer ratings database 130, movie review database 136, and movie database 138. Similar databases could be used for other types of content to store data applicable to those types of content.

The embodiments employ various machine learning (ML) methods, processes, or technologies to generate and adaptively update the individual and group recommendations, as well as to parse, process, and analyze the one or more natural languages that are employed by users 102-109 during the group collaboration. Thus, databases included in database collection 124 may be employed to train, tune, calibrate, or otherwise adapt the various embodiments based on the various ML methods. For instance, as discussed throughout, one or more databases included in database collection 124 may be employed in supervised and/or unsupervised learning or training of the various embodiments.

Social application 140 includes various engines, modules, analyzers, filters, or other such components. For instance, social application 140 may include a social network engine 142 that employs data included in social network database 132 to manage one or more social networks that include users, such as but not limited to users 102 through 109. Social application 140 may further include a content provider engine 144 that provides content, such as but not limited to movie content stored in movie database 138, to computing devices, such as but not limited to computing devices 112-119. VR and AR engine 146 may be specially adapted to provide VR- and/or AR-related content to computing devices. Additionally, social application 140 may include a user experience (UX) engine 148 that manages and provides one or more user interfaces (UI) to the various computing device. Such UIs may enable the social communication and consumption of content amongst users 102-109.

Social application 140 includes, implements, and/or enables a virtual assistant (VA) 150. VA 150 includes a speech-to-text engine 152, a natural language engine 160, and a recommendation engine 170. Speech-to-text engine 152 transforms audio data that includes a dialog in one or more natural languages into textual data. Speech-to-text engine 152 may likewise transform textual data into audio data that includes audible dialog in one or more natural languages. Thus, speech-to-text-engine 152 may employ any various speech-to-text and text-to-speech methods or processes.

VA 150 employs natural language engine 160 to parse, process, and analyze one or more natural languages included in the group collaboration. Natural language engine 160 may generate at least portions of dialog to provide users, based on other dialog that is parsed, processed, and analyzed. As such, natural language engine 160 may employ various natural language processing (NLP) and/or other machine learning techniques and methods to parse, process, and analyze the dialog. Various databases included in database collection 124 may be employed in supervised and/or unsupervised learning for natural language engine 160.

As discussed throughout, natural language engine 160 may include, or otherwise employ, a collaboration-classifier analyzer 162, a collaboration-filter analyzer 164, and a sentiment analyzer 166 to parse, process, analyze, and generate dialogs in one or more natural languages. The collaboration-classifier analyzer 162 may be trained to determine and classify keywords included in the group-collaboration dialog. The collaboration-filter may be trained to filter out or remove spurious results from the collaboration-classifier analyzer 162. The sentiment analyzer 166 may be trained to determine a sentiment for each classified keyword. Accordingly, VA 150 may employ speech-to-text engine 152 and natural language engine 160 to communicate with and interact with each of users 102-109 in one or more natural languages, with audio data, textual data, or a combination thereof. For instance, VA 150 may provide a group recommendation to each of the users and actively monitor the group dialog.

VA 150 employs recommendation engine 170 to generate individual and group recommendations. Recommendation engine 170 includes an individual recommendation module 180 and a group recommendation module 190. Although discussed in detail below, briefly, the individual recommendation module 180 employs a content-cluster analyzer 182 to generate and iteratively update individual recommendations for each of users 102-109. As discussed throughout, based on data stored in database collection 124, a plurality of user-interest clusters may be generated. A user-interest cluster employs a latent variable to generate correlations between users 102-109 and content scores provided by other users, based on the viewing history of users 102-109. Each user-interest cluster includes a distribution of scores or ratings for each title included in the set of available content. Based on user preferences, each of users 102-109 is associated with a probability of being included in each of the user-interest clusters. Based on probability or likelihood of being included in a particular user-interest cluster and the distribution of ratings of the content included in the user-interest cluster, the content may be collaboratively filtered or collaboratively ranked for each of users 102-109. Such collaborative ranking or filtering may be combined with content-based filter or ranking of the content to generate the individual recommendations for each of users 102-109.

Likewise, group recommendation module 190 generates and iteratively updates a group recommendation. Group recommendation module 190 may include or employ user dominance and influence analyzer 192 to generate and iteratively update models for the dominance of each of users 102-109 and a directed user-user influence associated with each pair of users 102-109. Group recommendation module 190 may combine the individual recommendations based on the dominance and user-user influence models to generate and update the group recommendation. Group recommendation module 190 may include or employ a group consensus and conflict analyzer 194 to analyze a group consensus and conflicts within the group, as indicated by the dialog included in the group collaboration.

It should be understood that the architecture shown for social application 140 in FIG. 1B is only an exemplary embodiment. Other embodiments are not so constrained, and thus other architectures may be employed to execute, at least portions of process workflows 200-700, of FIGS. 2-7 respectively.

Generalized Processes for Recommending Content Based on a Group Collaboration

Although processes 200-700 of FIGS. 2-7 are discussed in the context of recommending and providing movie content, it should be understood that the various embodiments are not so limited. That is, one of ordinary skill in the art would understand how the following discussion of processes 200-700 may be readily adapted for recommending and providing other content.

For instance, the below discussion is directed to providing titles of movies included in a set of movies available for on-demand streaming, stored in movie database 138 of FIG. 1B. As such, content-variables, such as but not limited to genres, artists, directors, writers, actors, composers, producers, and the like that are associated with each of the individual titles may be stored in movie info database 126. Ratings or scores for each of the individual titles, provided by a plurality of users may be stored in viewer ratings database 130. The movie ratings stored in viewer ratings database 130 may be culled from a much larger plurality of users than the user group that the embodiments are recommending content for. For example, system 100 of FIGS. 1A-1B may provide a group recommendation to a group of five users, based on viewer ratings culled from millions of other users. Movie review database 134 may include textual, audio, or video-based reviews of at least a portion of the available titles. Movie forum database 136 may include archived online discussions regarding at least a portion of the available titles. For instance, movie forum database 136 may include archived discussions culled from various popular online user discussion groups or bulletin boards. It should be understood how other similar resources may be adapted to recommend and provide other content. Such other content includes, but is not limited to musical albums, books, video games, television shows, online videos, and the like.

Figure 2:
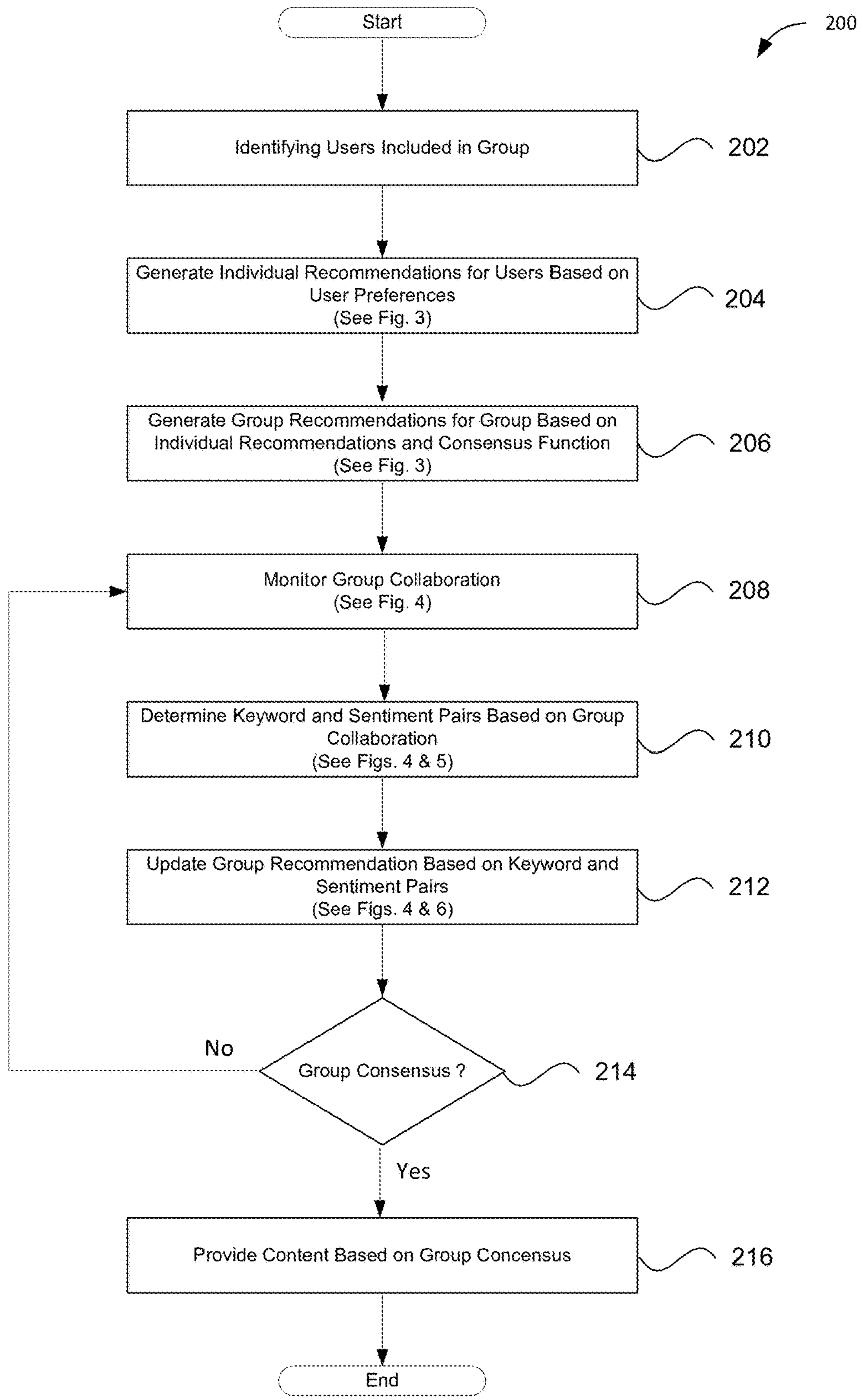
FIG. 2 illustrates one embodiment of a process flow for recommending and providing content to users included in a group that is consistent with the various embodiments presented herein.

FIG. 2 illustrates one embodiment of a process flow for recommending and providing content to users included in a group that is consistent with the various embodiments presented herein. Process 200 begins, after a start block, at block 202, were each of the users included in a user group are identified. Identifying each of the users may include receiving user credentials from each of the users. In at least one embodiment, the users are automatically identified via social network data, such as but not limited to social network data included in social network database 132 of FIG. 1B. In various embodiments, at least a unique user name uniquely identifies each of the users.

At block 204, an individual recommendation for each of the identified users is generated. Various embodiments for generating individual recommendations are discussed below in conjunction with process 300 of FIG. 3A. However, briefly here, the individual recommendations may be generated based on the user preferences of the users. An individual recommendation for a user may be a combination of a collaborative-based recommendation and a content-based recommendation. The collaborative-based recommendation may be based on collaborative-based user preferences of the user, while the content-based recommendation may be based on content-based user preferences of the user. Various embodiments of collaborative-based recommendations and content-based recommendations are discussed below. However, briefly, include recommendations for content be based on collaborative filtering. For instance, collaborative-based recommendations may include content recommendation based on the likelihood or probability that a user is a member of a cluster of users that have preferences for similar and/or associated content. In contrast, content-based recommendations include content recommendations based on a similarity of particular content to the user's preferences of content.

As used herein, an individual recommendation may be a recommendation or a suggestion that includes a subset of the set of available content. A specific individual recommendation is individualized, tailored, or otherwise targeted to a specific user and based on the user preferences of the specific user. An individual recommendation may include a ranking of at least a subset of the content based on the user preferences of the user. For instance, an individual score (or rating) may be assigned to individual movies, television episodes, musical albums, or other elements within the content. A ranking may include an ordered list of at least a portion of the individual titles of available content, wherein the order is based on the score associated with each title. For instance, the list may be a rank ordered list of individual movies, either in ascending or descending order based on the scores associated each movie. Thus, an individual recommendation may include suggestions of one or more individual titles of the set of the available content that a specific user of the group may find enjoyable and/or beneficial to consume, based on user preferences of the specific user.

At block 206, a group recommendation for the group is generated. Various embodiments for generating group recommendations are discussed below in conjunction with 300 of FIG. 3A. However, briefly here, the group recommendation may be generated based on a combination of the individual recommendations for each of the users and a consensus function.

As used herein, a group recommendation may be a recommendation or a suggestion for a subset of the set of available content tailored and/or targeted to the group of users. Similar to an individual recommendation, a group recommendation may include a ranking of at least a subset of the content. The ranking for the group recommendation may be based on a combination of the rankings for each of the individual recommendations. For instance, a group score may be assigned to individual movies, television episodes, musical albums, or other elements within the content based on the individual scores of the individual recommendations and a consensus function. A consensus function provides a function, method, or process for combining each of the individual recommendations to generate a group recommendation. Various embodiments of combining individual recommendations are discussed throughout. For instance, the individual recommendations may be combined based on one or more sets of weights, such as, but not limited to user-user influence weights, user dominance weights, or the like.

The group recommendation generated at block 206 may be an initial group recommendation. The group recommendation may include, for instance, three or more titles of the content that have the highest associated group scores. At block 206, the initial group recommendation is provided to each of the users. For instance, a VA may provide the initial group recommendation to the users to initiate or seed a group collaboration that includes a dialog about the initial group recommendation. The VA may provide the group recommendation via audio data that includes a message in one or more natural languages. For instance, the VA may verbally provide the group recommendation as, "May I suggest movies A, B, and C."

The VA may provide the group recommendations to the users via one or more distinct vocal patterns. Because each user may interact with the VA via a separate computing device, each user may individually select and/or tailor not only the vocal patterns, gender, accent, dialect, and other stylistic variances of the VA, but also the natural language employed the VA to their own preferences.

At block 208, the group collaboration is monitored. As noted throughout, the group recommendation is seeded by the VA providing the initial group recommendation to the users. Various embodiments for monitoring a group collaboration are discussed below in conjunction with process 400 of FIG. 4. However, briefly here, monitoring the group collaboration may include receiving, parsing, and analyzing the dialog included in the group conversation. The dialog may be based on the group content recommendation. As such, monitoring the group collaboration may include receiving audio and/or textual data that includes the dialog. In various embodiments, when audio data is received, a speech-to-text engine, such as but not limited to speech-to-text engine 152 of FIG. 1B may be employed to transform the audio data into textual data.

At block 210, keyword and sentiment pairs are determined based on the group collaboration. Various embodiments for determining keyword and sentiment pairs are discussed below in conjunction with processes 400 and 500 of FIGS. 4 and 5, respectively. However, briefly at block 210, keywords that are included in the monitored dialog and associated with, corresponding, related, or otherwise relevant to a portion of the available content are determined. Natural language engine 160 may employ various natural language processing (NLP) methods to parse, process, and analyze the monitored dialog. The various databases included in database collection 124 may be employed to train (supervised and/or unsupervised), via various machine learning (ML) methods, the natural language engine 160.

More specifically, the various NLP methods may be trained and employed to recognize and/or determine relevant keywords within the dialog. The NLP methods may also classify and/or tag the relevant keywords, based on natural language analysis of other words and structure near the recognized keywords. Such keywords may include content-variables, such as but not limited to genres, artists, directors, writers, actors, composers, producers, and the like that are associated with various available titles. Accordingly, natural language engine 160 may employ movie info database 126 to recognize and/or determine keywords. The user that is the speaker and/or communicator of each determined keyword is associated with the keyword at block 210.

A sentiment analyzer, such as but not limited to sentiment analyzer 166 of FIG. 1B, may be employed to determine a sentiment for each determined. Thus, a plurality of keyword and sentiment pairs may be generated at block 210. Each keyword and sentiment pair is associated with the user that is the speaker or communicator of the keyword and the sentiment. Thus, one or more keyword and sentiment pairs may be associated with one or more of the users.

As used herein, a sentiment is subjective information, such as but not limited to the attitude of the speaker or communicator of the keyword, with respect to the specific content that is associated with the keyword. In various embodiments, a sentiment includes at least one of a positive, negative, or neutral intent of the speaker, which is directed toward the associated content.

A sentiment may include a numerical value that is associated with or corresponding to the intent of the speaker. In one exemplary embodiment, the value of a sentiment may range from [−1, +1]. A sentiment value of −1.0 may indicate an extremely negative intention of the speaker, while a sentiment value of −0.1 may indicate only a mildly negative intention of the speaker. Similarly, a sentiment value of +1.0 may indicate an extremely positive intention of the speaker, while a sentiment value of +0.1 may indicate a mildly positive intention of the speaker. An intention value of 0.0 may indicate a neutral intention of the speaker. It should be understood that other ranges and scales for the sentiment value are possible. The sentiment value may be continuous or a discretized variable.

At block 212, the group recommendation is updated. Various embodiments for updating the group recommendation are discussed below in conjunction with processes 400 and 600 of FIGS. 4 and 6, respectively. However, briefly, at block 212, the group recommendation is updated based on the group collaboration. More specifically, the group recommendation is updated based on the keyword and sentiment pairs, and the association of the keyword and sentiment pairs with the users. Thus, the group recommendation is updated based on the moods and preferences of each of the users, as indicated in the keyword and sentiment pairs associated with each user.

The keyword and sentiment pairs associated with a particular user are employed as feedback to update the collaborative-based and/or the content-based user preferences of the particular user. The individual recommendation for the particular user is updated based on the updated user preferences. The group recommendation is updated based on each of the updated individual recommendations. The updated group recommendation is provided to each of the users to guide the group collaboration based on the moods and preferences of the users. Thus, iteratively updated group recommendation is provided as feedback to the group, and the ongoing collaboration is employed as feedback to iteratively update the group recommendation.

At decision block 214, it is determined whether a group consensus is detected. As used herein, a group consensus is an indicator that the group, as a whole, has agreed on particular content to consume. If a group consensus is not detected, process 200 flows back to block 208 to continue monitoring the group collaboration. If a group consensus is detected, process 200 flows to block 216. At block 216, the agreed upon content is provided to each of the users, based on the group consensus. Process 200 may terminate and/or return a calling process.

Thus, at least portions of process 200 enable a social content consuming system, such as but not limited to system 100 of FIGS. 1A-1B, which provides group recommendations for content based on each user of the group. The group recommendation is iteratively updated based on an ongoing and actively monitored dialog between the users. Thus, the evolving moods and/or preferences of each of the users are accounted for when updating the group recommendation. The various embodiments of process 200 employ dialog-based feedback to update the group recommendations, such that the recommendations are consistent with current and real-time preferences of the users. Such embodiments enable a socially collaborative platform that catalyzes a group consensus regarding which content to consume, unobtrusively resolves conflicts within the group, and provides the group with a shared social experience of viewing, listening to, and/or interacting with the decided upon content.

Figure 3A:
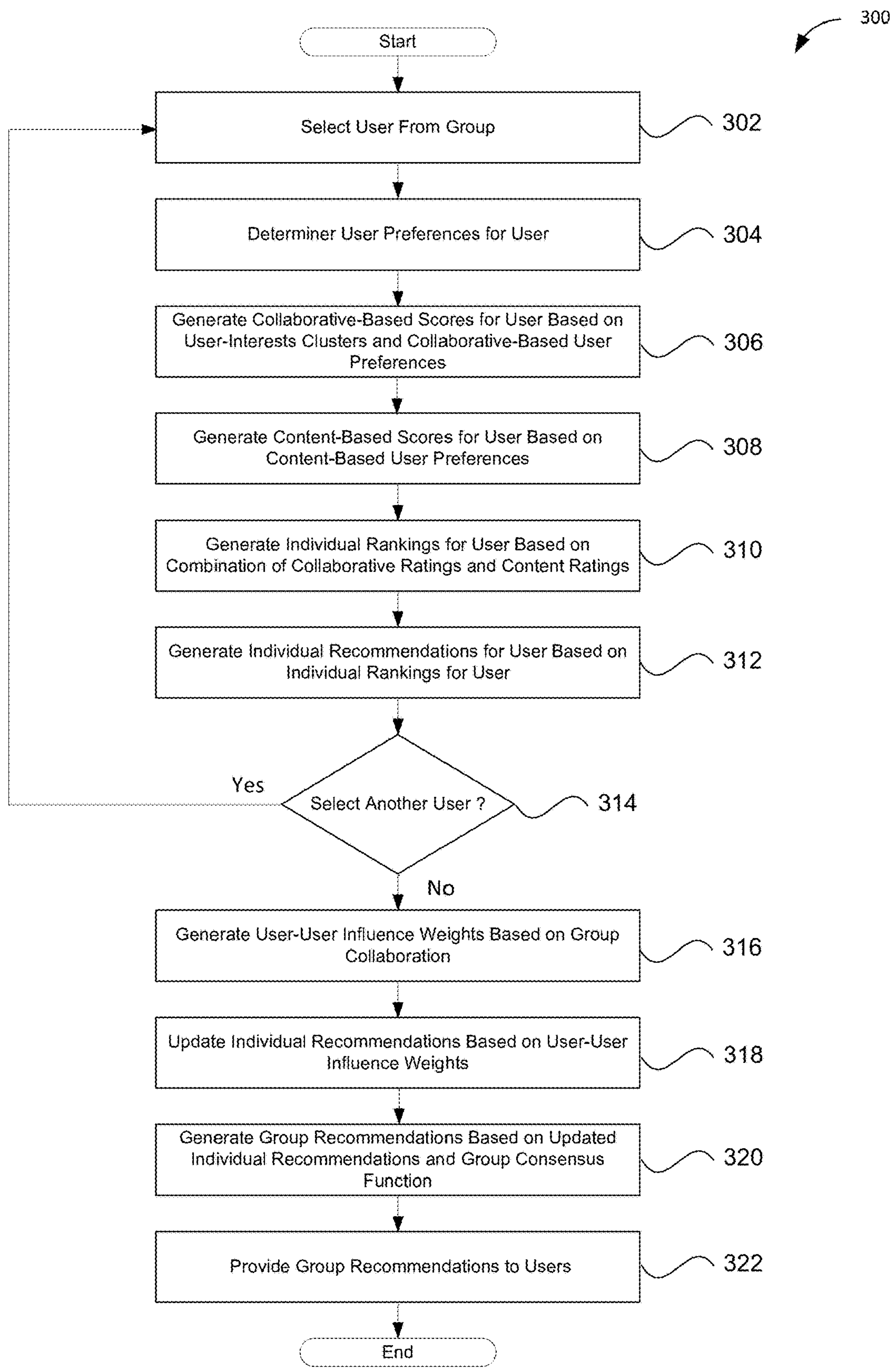
FIG. 3A illustrates one embodiment of a process flow for generating individual recommendation and group recommendations that is consistent with the various embodiments presented herein.

FIG. 3A illustrates one embodiment of a process flow for generating individual recommendation and group recommendations that is consistent with the various embodiments presented herein. As discussed throughout, an individual recommendation for a particular user may be based on collaborative filtering (or ranking) and content filtering (or ranking) of the set of available content based on the user preferences of the particular user. The results of the collaborative filtering and the content filtering for the particular user are combined to generate the individual recommendation for the particular user. For instance, in embodiments directed at recommending movie content, the individual recommendation for the particular user may be based on their viewing history. Upon the generation of an individual recommendation for each of the users, the group recommendation is generated based on a combination of the individual recommendations for each of the users.

Process 300 begins, after a start block, at block 302 where a user included in the user group is selected from the group. At block 304, the user preferences for the selected user are determined. For instance, a database, such as but not limited to user database 128 of FIG. 1B, may be accessed to determine the user preferences for the selected user. The user preferences may include collaborative-based user preferences, as well as content-based user preferences. As discussed throughout, collaborative-based user preferences of the selected user may include probabilities that the selected user is included in various user-interest clusters.

In contrast, content-based user preferences may include ratings or scores for content previously viewed and rated by the selected user. Such ratings or scores may be referred to as "user content-specific scores." Content-based user preferences may also include content-variable scores based on the scores for content previously viewed. Content-variable scores may include scores for content-variables. As used herein, "content-variable" refers to various variables associated with the content. For instance, in the context of movie-related content, content variables may include, but are not otherwise limited to genres, actors, writers, composers, producer, directors, and the like associated with movie content. Hence, the genre-variable for a specific title, m, may be "comedy." Likewise, the actor-variables for m may include each of the actors that act in m. Director-variables, writer-variables, and the like may be similarly defined. Such content-variables associated with individual titles may be queried, searched, or otherwise accessed via movie info database 126.

Content-variable scores of the selected user may be based on combinations of the selected user's content-specific scores. For instance, the genre content-variable score, for the comedy genre, of the selected user may be a combination of the selected user's content-specific scores, for a plurality of movies that have the genre-content variable set to comedy. Accordingly, if the selected user has previously scored comedies as high, the genre content-variable score, for comedies, of the selected user will be relatively high. Likewise, if the selected user has previously scored movies that are associated with specific actor A, then the actor content-variable score, for that actor A, of the selected user will be relatively low. Each of the collaborative-based user preferences and the content-based preferences of the selected user may be based on the selected user's viewing history, stored in user database 128.

At block 306, collaborative-based scores for the selected user are generated. Furthermore, once initially generated, the collaborative-based scores for the selected user may be updated via the various embodiments discussed herein. For instance, when the collaborative-based scores are not yet generated for the selected user, the collaborative-based scores may be generated at block 306. After an initial generation, as the user preferences for the selected user are updated, the collaborative-based scores for the selected user may be updated via similar methods to the generation of the initial collaborative-based scores.

Generating and/or updating the collaborative-based scores may be based on user-interest clusters and the collaborative-based preferences for the selected user. More specifically, a collaborative-based score, for the selected user, is generated and/or updated for at least a portion of the titles of available content. Thus, a collaborative-based ranking, for the selected user, of the available titles may be generated and/or updated. That is to say, one or more collaborative filters may be applied to the set of available content to obtain a collaboratively-filtered ranked list.

In the various embodiments, the collaborative-based scores are generated and/or updated via one or more probabilistic techniques. For instance, the collaborative-based scores may be generated and/or updated via a probabilistic latent semantic analysis (pLSA). Essentially, the pLSA generates and/or updates a collaborative-based score for at least a portion of the titles in the set of available content based on probabilities that the user is included in various user-interest clusters, and a distribution of user-interest cluster scores for the title within each of the plurality of user-interest clusters.

Figure 7:
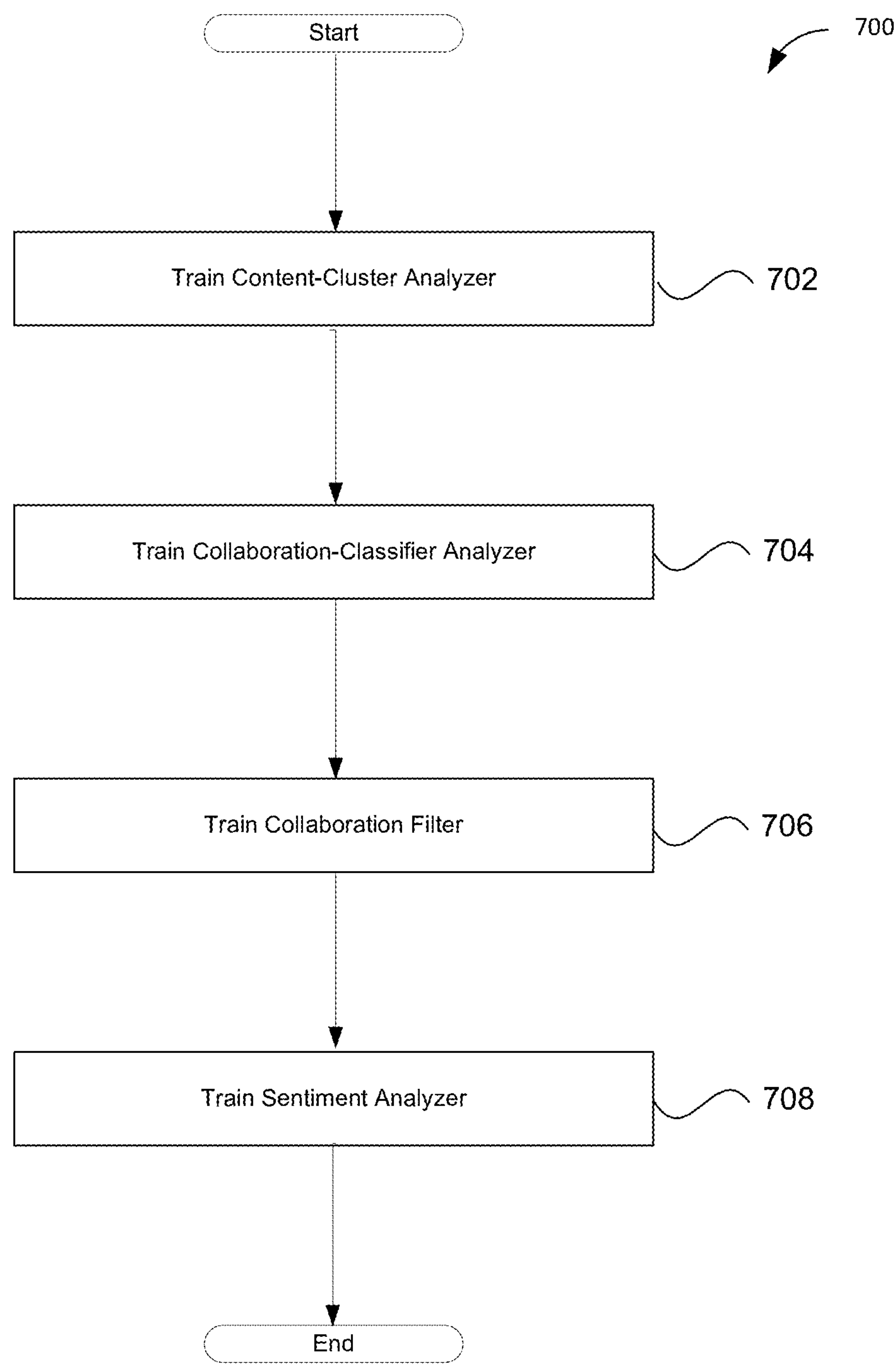
FIG. 7 illustrates one embodiment of a process flow for training various embodiments presented herein.

A latent variable, z, represents the user-interest clusters, the generation of which are discussed in conjunction with at least FIG. 7. However, briefly, the pLSA may be trained, based on one or more databases (such as but not limited to viewer ratings database 130) that include scores (or ratings, r) from other users for each title of the available content. The one or more databases (such as but not limited to movie info database 126) may also include content-variables for each of the available titles.

The pLSA may be trained for the generation of the plurality of user-interest clusters. Each user-interest cluster includes distributions of ratings for each title. Once the user-interest clusters are generated, prominent content-variable features, such as but not limited to prominent genres, actors, directors, and the like are determined for each user-interest group. Each title has a separate distribution of ratings (or scores) for each user-interest cluster based on the prominent features. Thus, each user-interest cluster includes a separate ranking for the available content. Based on the scores for the user-clusters, a content-variable score (such as but not limited to a genre-scores, actor-scores, director-scores, composer-scores, writer-scores, producer-scores, and the like) may be determined for each user-interest cluster.

Figure 3B:
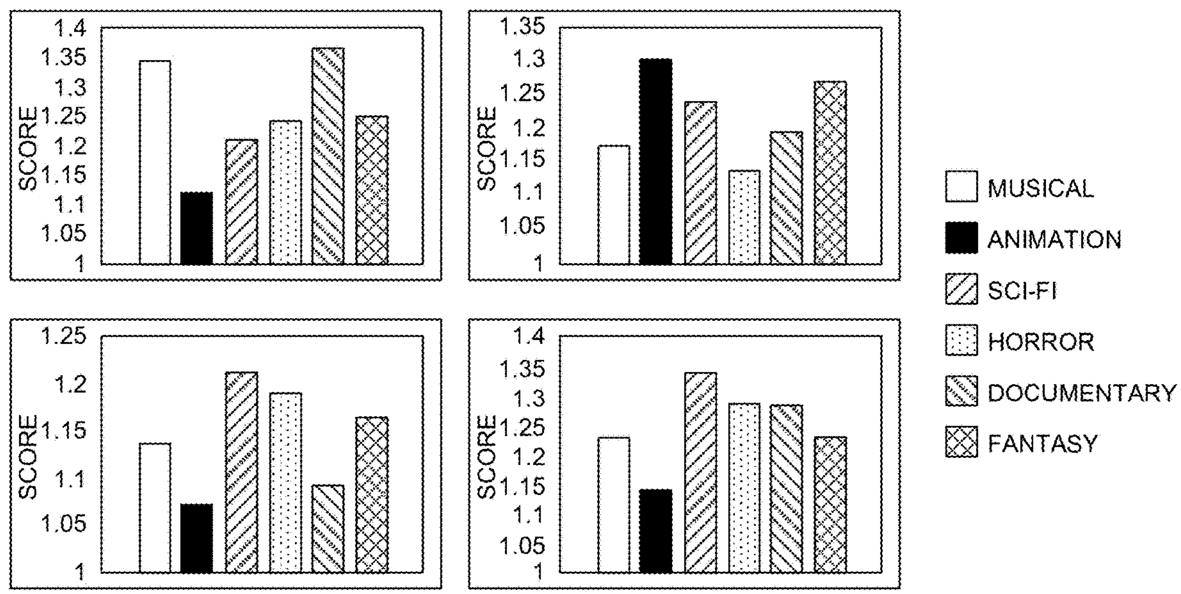
FIG. 3B shows a distribution of genre-scores for four user-interest clusters.

FIG. 3B shows a distribution of genre-scores for four user-interest clusters. Each of the four clusters includes a genre-score for six genres: musical, animation, sci-fi, horror, documentary, and fantasy. For a user that tends to enjoy animation-based movies (based on viewing history), the user will have a relatively large probability for being included in the user-interest cluster in the top-right quadrant of FIG. 3B. A user that tends to not enjoy documentaries will have a lower probability for being included in the user-interest cluster of the top-left quadrant of FIG. 3B. Although not shown in FIG. 3B, each of the user-interest clusters may have distributions for actor-scores, director-scores, and the like.

Figure 3C:
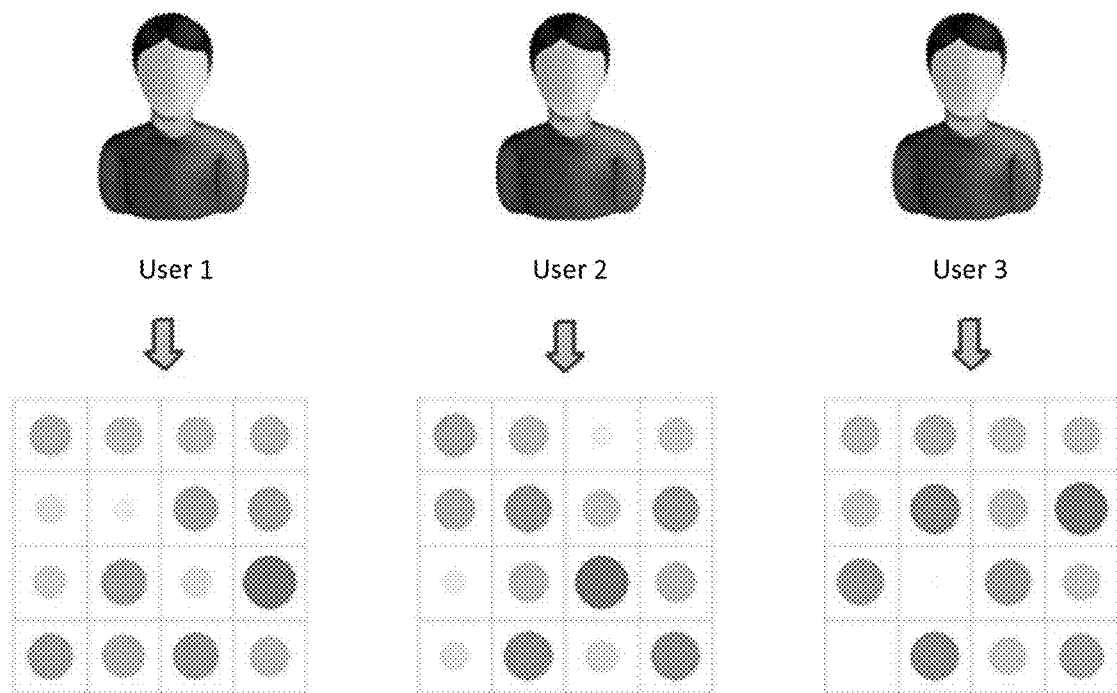
FIG. 3C shows a distribution of probabilities for three users to be included in sixteen user-interest clusters.

More particularly, the distribution of scores (r) for a particular title (m) within user-interest cluster (z) is represented as the conditional probability P(r|m,z). Based on the selected user's viewing history (as available in the one or more databases), the collaborative-based user preferences may include a distribution of probabilities that the selected user is included in each of the user-interest cluster, as indicated by P(z|u), where u indicates the selected user. FIG. 3C shows a distribution of probabilities for three users (User 1, User 2, User 3) to be included in sixteen user-interest clusters (represented by the 4×4 grid below each user). The area of the disk in each of the sixteen user-interest clusters corresponds to P(z|u).

The collaborative-based score (r) for each title (m) of the available content for the selected user (u) may be generated and/or updated by summing across over the user-interest clusters, as follows:

$$P(r \mid u, m) = \sum_{z} P(r \mid m, z) P(z \mid u)$$

Figure 3D:
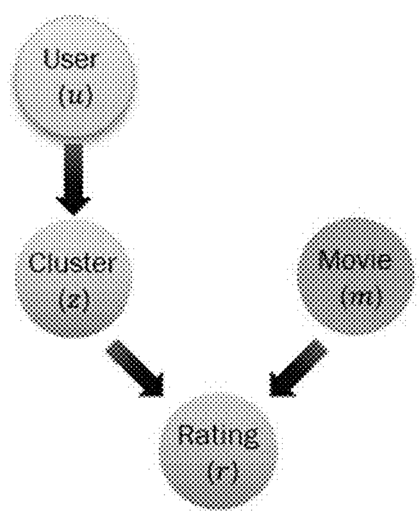
FIG. 3D illustrates a latent variable correlating users and movies.

FIG. 3D schematically illustrates a latent variable (z) correlating a user (u) and a title (m) to generate a collaborative-based score (r). It should be understood that other collaborative-based scoring, filtering, or ranking schemes may be employed to generate and/or update the collaborative-based scores at block 306.

Returning to FIG. 3A, at block 308, content-based scores for the selected user are generated. Upon initial generation of the content-based scores, content-based scores may be updated via the various embodiments discussed. Similar to the collaborative-based scores of block 306, when the content-based scores are not yet generated for the selected user, the content-based scores may be generated at block 308. After an initial generation, and as the user preferences for the selected user are updated, the content-based scores for the selected user may be updated at block 308.

Generating and/or updating the content-based scores may be based on the content-based preferences for the selected user. More specifically, a content-based score is generated and/or updated for each title of available content for the selected user. Thus, a content-based ranking of the available titles of the content for the selected user may be generated and/or updated at block 306. One or more content filters may be applied to the set of available content.

A content-based score for a particular title may be based on a combination of one or more content-variable scores. For instance, content-variable score, such as a genre-based score for a particular title (m) may be based on a weighted sum or combination of the ratings (r) for all available movies that are classified within the same genre as title m. Similarly, an actor-based score for m may be based on a weighted sum of the ratings for all available movies that include an actor that is the same as an actor included in m. The content-based score for title m may be based on a weighted combination of the genre-based score and the actor-based score, as well as other content-variable scores for m, such as but not limited to director-based score, composer-based score, and the like. It should be understood that other content-based scoring, filter, or ranking schemes may be employed to generate and/or update the content-based scores at block 308.

At block 310, individual rankings for the content for the selected user are generated. Individual rankings for the selected user may be updated at block 310. Similar to the collaborative-based scores of block 306, when the individual rankings are not yet generated for the selected user, the individual rankings may be generated at block 310. After an initial generation, as the collaborative-based and content-based scores for the selected user are updated, the individual rankings for the selected user may be updated at block 310.

In at least one embodiment, the individual rankings for the selected user are generated and/or updated based on a combination of the collaborative-based scores and the content-based scores for the selected user. A total-individual score for each title may be generated and/or updated based on a combination of the collaborative-based scores for the title and the content-based score for the title. For instance, the total-individual score for title m may be generated and/or updated based on a weighted combination of the collaboration-based score and the content-based score for title m. The individual rankings for the selected user may include a ranking of each individual title based on the total-individual scores for each of the titles.

At block 312, an individual recommendation for the selected user is generated. The individual recommendation for the selected user may be updated at block 312. Similar to the collaborative-based scores of block 306, when the individual recommendation is not yet generated for the selected user, the individual recommendation may be generated at block 312. After an initial generation, as the individual recommendation for the selected user is updated, the individual recommendation for the selected user may be updated via the various embodiments.

The individual recommendation may be based on or include the individual rankings of the content. In some embodiments, the individual recommendation includes the total-individual scores for each title of available content. At decision block 314, it is determined whether to select another user. Process 300 returns to block 302 to select another user. When the individual recommendations for each of the users has been generated and/or updated, process 300 flows to block 316.

Figure 3E:
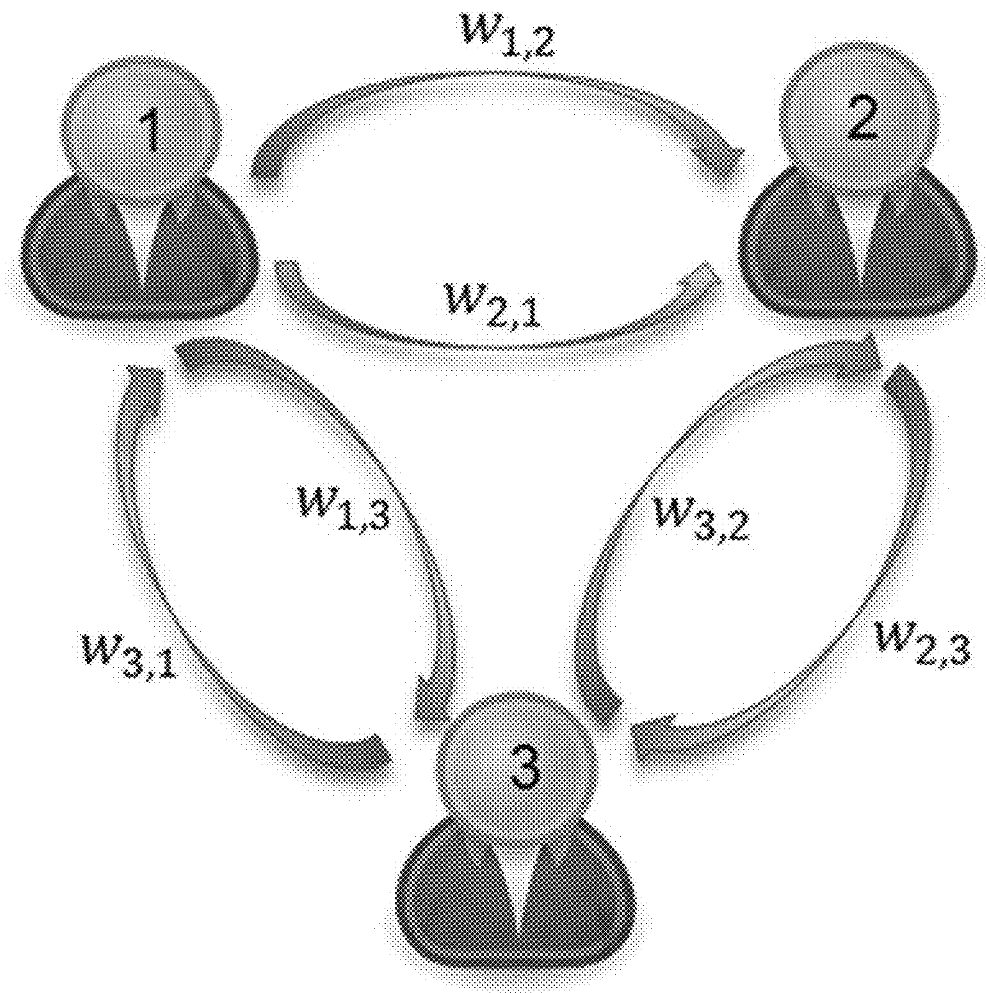
FIG. 3E illustrates a user-user influence graph for a group of three users.

At block 316, user-user influence weights are generated and/or updated for each pair of users in the group. Various embodiments for generating and/or updating user-user influence weights are discussed below in conjunction with process 800 of FIG. 8. However, briefly here, a user-user directed influence graph is generated, wherein directed edges include directed user-user influence weights ($w_{ij}$) for the user-user i-j pair. The user-user influence weights may be based on the group collaboration, where $w_{ij}$ models the influence of User-i on User j. For instance, the weights are based on the dialog that is monitored via block 208 of FIG. 2. FIG. 3E illustrates a user-user influence graph for a group of three users (User 1, User 2, User 3), More specifically, $w_{ij}$ may be based on a degree of agreement that user-j shares with user-i. Note, as shown in FIG. 3E, the user-user influence graph may include a pair of directed (and asymmetric) edges for each pair of users. That is to say, $w_{ji}$ need not be equivalent to $w_{ij}$. Each of the user-user influence weights may be based on the keyword and sentiment pairs generated, as discussed in conjunction with processes 400 and 500 of FIGS. 4-5. For instance, $w_{ij}$ may be based on a sentiments of user j, when agree or disagreeing with user-i. Agreement and/or influence of user-i on user-j may increase the value of $w_{ij}$. Whereas disagreement between user-i and user-j may decrease the value of $w_{ij}$. In at least one embodiment, each of the user-user influence weights may be initially set to 0.0. During the course of the dialog, the user-user influence weights are updated or adjusted as agreements and disagreements between the pairs of users are parsed, processed, and analyzed based on the determined keyword and sentiment pairs associated with the users.

Various NPL methods may be employed to determine the levels of agreement/disagreement between pairs of users, as well as the how the level of agreement/disagreement various during the course of the dialog to update the user-user influence weights. For instance, part-of-speech (POS) tagging, as discussed in conjunction with process 500 of FIG. 5, may be employed to parse, process, and analyze sentences within the dialog. The speakers, as well as subjects, objects, verbs, adverbs, and the like may be detected. As discussed in conjunction with process 500, keyword and sentiment pairs may be determined. Such keyword and sentiment pairs, as well as other POS are employed to identify or recognize agreement and disagreement between each pair of users. Based on either positive or negative changes of the levels of agreement and disagreement between the users, the corresponding user-user influence weights may be updated to reflect the magnitude and direction of the changes of the levels of agreement and disagreement.

At block 318, the individual recommendations for each of the users are updated based on the user-user influence weights. For instance, $r_{m,i}$ if represents the total-individual score for title m for user-i, then $r_{m,i}$ may be updated as follows (where β is a regularization parameter):

$$r_{m,i} = r_{m,i} + \sum_{j \neq i} \frac{w_{j,i}}{\sum_{k \neq i} w_{k,i} + \beta} \left( \frac{r_{m,j} + r_{m,i}}{2} - r_{m,i} \right)$$

In at least one embodiment, β may be set to be equivalent to the number of users in the group. Accordingly, at block 318, the total-individual scores for each of the users are "nudged" together to accelerate the arriving at a group consensus. The individual recommendations, as well as the individual rankings, may be updated based on the updated total-individual scores.

At block 320, the group recommendation is generated and/or updated. In various embodiments, the group recommendation is based on the individual recommendations and a group consensus function. The group consensus function may take the form of virtually any function that generates a ranking of the titles of available content. That is to say, the group consensus function may generate virtually any combination of the total-individual scores for each of the titles of content to generate a group score for the titles of content.

In at least one embodiment, the group consensus function includes one or more filters to filter out or remove various titles of the content from further consideration. For example, an "average without misery" filter may be employed to filter out various titles whose total-individual score for any one or more users within the group falls below a filter threshold. That is to say, when the total-individual score for a title is less than the filter threshold for at least one user, the title is not included in (or excluded from) the group recommendation.

Upon applying the one or more filters of the group consensus function, the group consensus function may generate and/or update a group score for each of the remaining titles based on various weighted combinations of the updated total-individual scores or rankings for each of the titles. In one exemplary embodiment, a group score for a particular title may be based on a user dominance weighted combination of each of the total-individual scores for the particular title. In such embodiments, the dominance of each user may be modeled based on the monitored dialog. For instance, the more dominating a user is within the dialog, the greater the user dominance weight associated with that user is. Accordingly, the individual recommendations for the more dominating users are weighted more heavily when generating and/or updating the group recommendation.

The dominance weight for a particular user may be generated and/or updated based on the user-user interactions in the dialogue. For example, the user dominance weight for a particular user may be based on the number of turns (or frequency) for which the particular user speaks within the dialog, the number of times (or frequency) the particular user was mentioned by other users in the group, and the like. Various factors, such dominance metric, extracted from the dialog, may be employed to determine the user dominance weight for each user. The user dominance weight for each user may be iteratively updated during the course of the group collaboration.

The group recommendation may include at least the top three ranked titles within the set of available content. For instance, the group recommendation may include three or more titles of content with the highest group score. At block 322, the group recommendation is provided to each of the plurality of users. For instance, the VA may speak the top three ranked content titles within the group recommendation to each of the remote users. As such, the VA may verbally provide the group recommendation as, "May I suggest movies A, B, and C." Process 300 may terminate and/or return a calling process.

Figure 4:
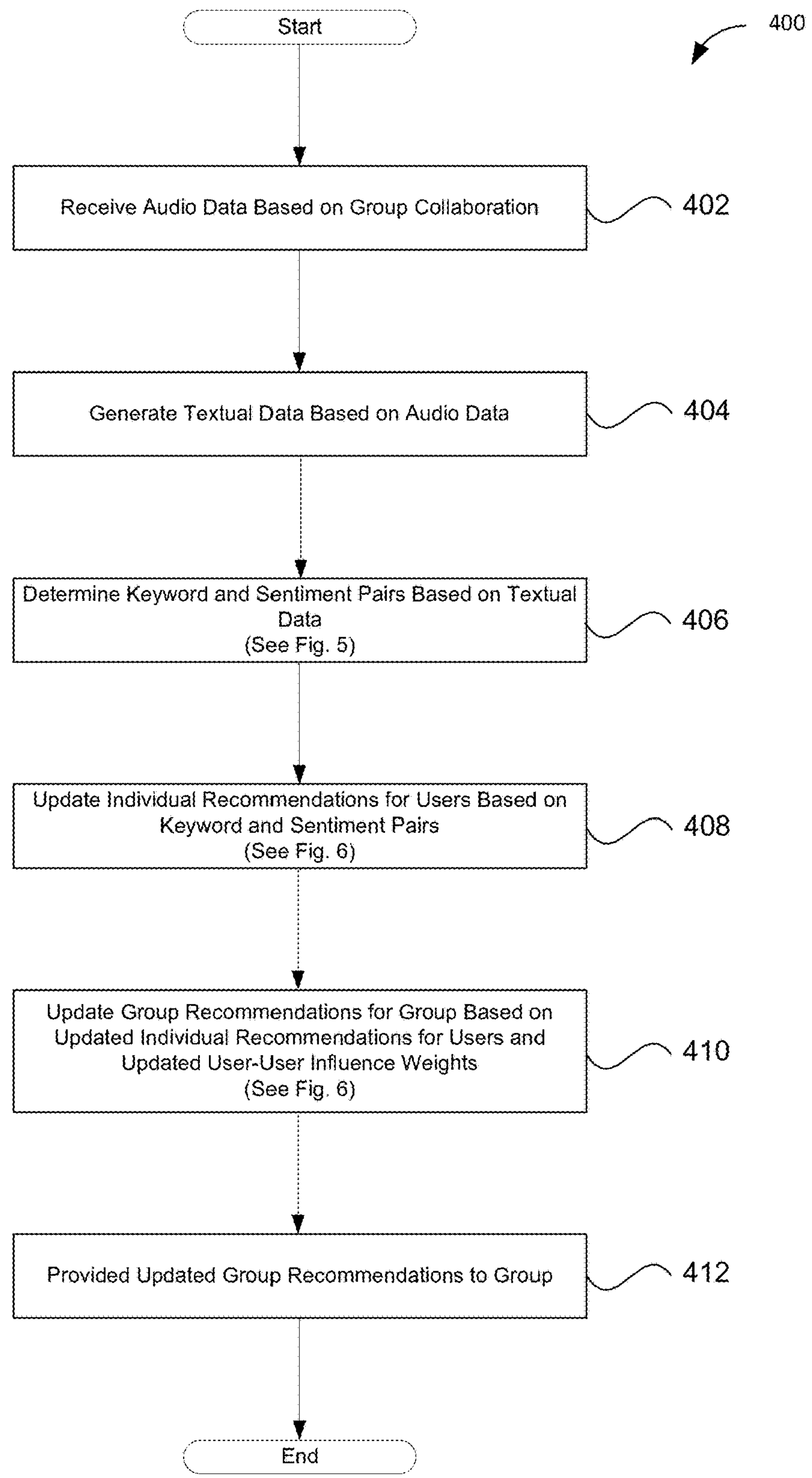
FIG. 4 illustrates one embodiment of a process flow for updating a group recommendation based on a group collaboration that is consistent with the various embodiments presented herein.

FIG. 4 illustrates one embodiment of a process flow for updating a group recommendation based on a group collaboration that is consistent with the various embodiments presented herein. Process 400 begins, after a start block, at block 402 were audio data may be received. The audio data may be based on and/or include the group collaboration. For instance, the dialog may be embedded in the received audio data. For other embodiments, the group collaboration may be textual. In such embodiments, text data may be received at block 402.

In embodiments where audio data is received at block 404, textual data may be generated based on the audio data. For instance, a speech-to-text engine, such as but not limited to speech-to-text engine 152 of FIG. 1B, may generate the textual data based on the audio data. Any speech-to-text, speech recognition, transcription, or such method may be employed to transcribe the audio-based dialog into a textual-based dialog.

At block 406, keyword and sentiment pairs are determined based on the textual data. Various embodiments for determining keyword and sentiment pairs based on the textual data are discussed in conjunction with process 500 of FIG. 5. However, briefly, various keywords relating to the content, such as but not limited to keywords indicating and/or corresponding to content-variables, such as but not limited to genres, artists, directors, writers, actors, composers, producers, and the like may be determined. For each determined keyword, a sentiment of the user that communicated the keyword is also determined based on the context included in the textual data. The user that communicated the keyword is associated with the keyword at block 406. The sentiment of the user that communicated the keyword is also determined at block 406. Accordingly, a plurality of keyword and sentiment pairs are determined block 406 and associated with the speaker or communicator of the keyword and sentiment. A keyword and sentiment pair may be represented as a 3-tuple (keyword, sentiment, speaker/communicator).

It should be noted that any natural language processing (NLP) method may be employed to parse, process, and analyze the dialog embedded in either the received audio data or the textual data. For instance, a natural language engine, such as but not limited to the natural language engine 160 of FIG. 1B may be employed to apply NLP methods to the textual data and determine the keyword and sentiment pairs, as well as the associated user for each of the keyword and sentiment pairs. Collaboration classifier analyzer 162 may classify and/or tag at least a portion of the words included in the textual data. The collaboration-filter analyzer 164 may filter out irrelevant and/or spurious results of the collaboration-classifier 162. The output of the collaboration-filter analyzer 164 may be received at the sentiment analyzer, so that corresponding sentiment of the communicator may be determined for each keyword.

At block 408, the individual recommendations for the users are updated based on the keyword and sentiment pairs. Various embodiments for updating the individual recommendations for each of the users are discussed in conjunction with at least process 300 of FIG. 3A and process 600 of FIG. 6. However, briefly, the user preferences for each of the users are updated based on the keywords and sentiments associated with each user. For instance, the content-based preferences of a particular user may be updated based on the keyword and sentiment pairs associated with the particular user. Furthermore, the collaborative-based preferences of the particular user may be updated based on the keyword and sentiment pairs associated with the particular user. In various embodiments, the individual recommendations of the particular user are updated based on the updated user preferences.

At block 410, the group recommendation for the group is updated based on the updated individual recommendations for each of the users. Various embodiments of updating a group recommendation based on updated individual recommendations are discussed in conjunction with process 300 of FIG. 3A and process 600 of FIG. 6. However, briefly at block 410, the group recommendation may be updated based on a weighted combination of the updated individual recommendations. The user-user influence weights, as well as the user dominance weights, may be iteratively updated based on the keyword and sentiment pairs. Accordingly, the group recommendation may be updated based on at least one of the updated user-user influence weights or the user dominance weights.

At block 412, the updated group recommendation is provided to each of the users of the group. The VA may provide the updated group recommendation via audio data that includes a message in one or more natural languages. For instance, the VA may verbally provide the updated group recommendation as, "May I suggest movies A, B, and C." Accordingly, the group's dialog may shift focus based on the updated group recommendation. Process 400 may terminate and/or return a calling process.

Figure 5:
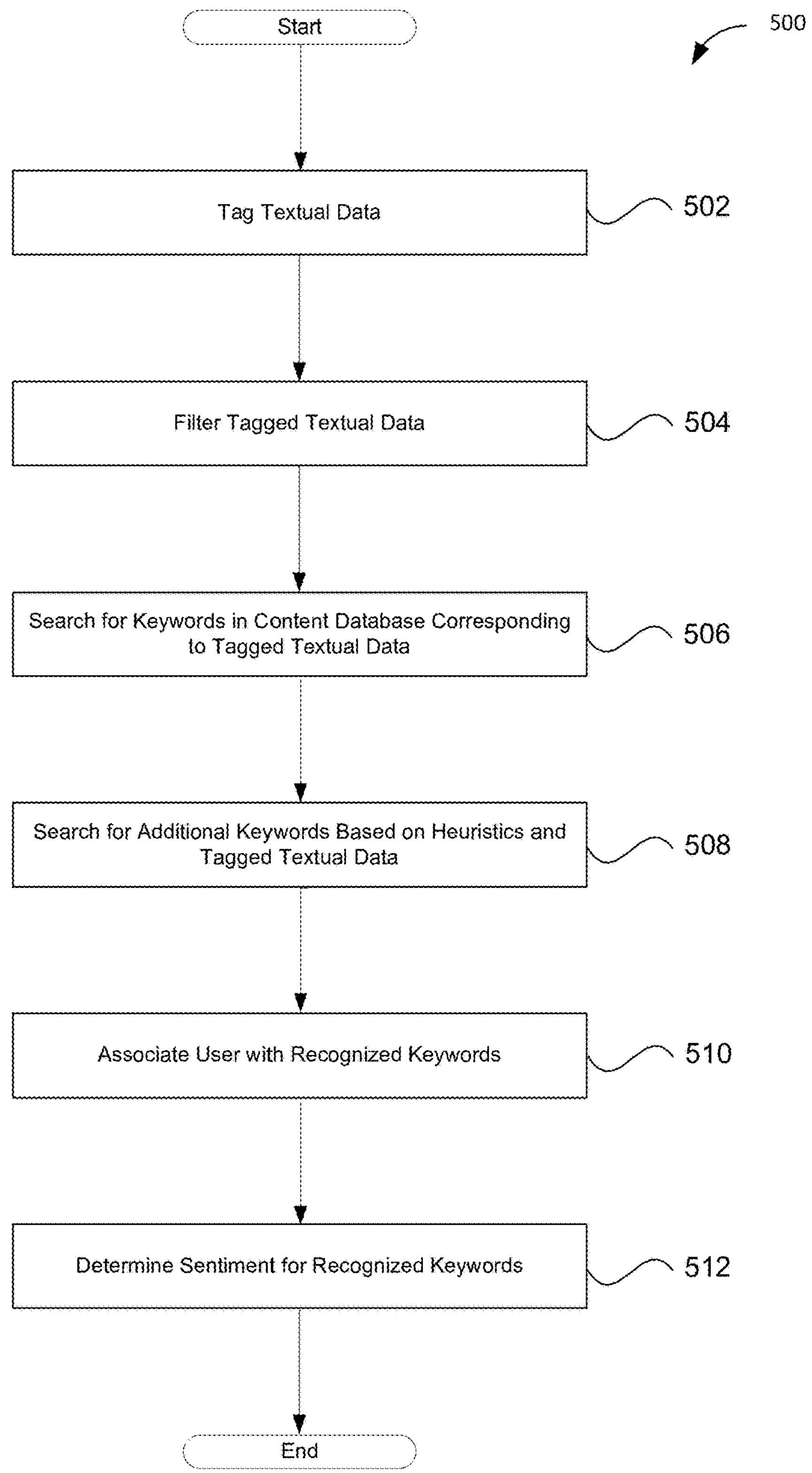
FIG. 5 illustrates one embodiment of a process flow for determining keyword-sentiment pairs included in a dialog of the group collaboration that is consistent with the various embodiments presented herein.

FIG. 5 illustrates one embodiment of a process flow for determining keyword-sentiment pairs included in a dialog of the group collaboration that is consistent with the various embodiments presented herein. In process 500, various NLP methods may be employed to determine the keyword and sentiment pairs.

Process 500 begins, after a start block, at block 502 were at least a portion of the words included in the textual data are classified and/or tagged. In various embodiments, the textual data is the textual data generated in block 404 of process 400. The textual data includes the dialog of the group collaboration. In at least one embodiment, process 500 is applied directly to audio and/or video data. That is to say, the NLP methods discussed herein are employed directly on audio and/or video data, without first transcribing audio-based dialog into textual data.

At least a portion of the words included in the dialog may be classified and/or tagged at block 502. In at least one embodiment, a part-of-speech (POS) tagger is employed to classify and/or tag the words. The POS tagger may classify and/or tag at least a portion of the words included in the dialog as one or more parts of speech. For instance, words within the dialog may be classified and/or tagged as subject, object, noun, verb, adjective, adverb, pronoun, and the like.

In other embodiments, more advanced ML methods, such as inside, outside, beginning (IOB) tagging may be employed to classify and/or tag the words. In such embodiments, a collaboration-classifier analyzer, such as but not limited to collaboration-classifier analyzer 162 of FIG. 1B, may be trained to perform the IOB be tagging. For instance, a gradient boosting method may be employed to train the collaboration-classifier analyzer. Various embodiments for training the collaboration-classifier analyzer are discussed in conjunction with process 700 of FIG. 7.

At block 504, one or more filters are applied to the tagged textual data to remove anomalies or spurious results of the classifier or tagger. The one or more filters may be applied via a collaboration-filter analyzer, such as but not limited to collaboration-filter analyzer 164 of FIG. 1B. In some embodiments, a Hidden Markov Model (HMM) filter is employed to remove noise introduced at block 502, via the collaboration-classifier analyzer. For example, when a transition probability from a first state to a second state for a word falls below one or more HMM thresholds, the original tag may be replace by one or more HMM associated tags.

At block 506, one or more databases may be queried, searched, or otherwise accessed to determine and/or recognize keywords in the tagged and filtered textual data. For instance, keywords relating to content-variables (genres, movie titles, actors, directors, and the like) of the content may be recognized within the text. A database, such as but not limited to movie info database 126, may be queried, searched, or otherwise accessed to determine and/or recognize exact keywords. Truncated versions of keywords may be found within the dialog. For instance, an actor may be referred to only via a last name in the dialog. Accordingly, the search of the one or more databases may search for truncated portions of database entries. Contextual matching may be applied in such truncated searches. For example, various NLP methods may be employed to provide context for truncated names of actors, directors, and the like.

At block 508, additional keywords are searched for based on heuristics and the tagged textual data. For instance, the users may employ personal pronouns or other non-deterministic identifiers to refer to content-variable keywords, such as "that actor," or the like. Various linguistic heuristics and NLP methods are employed to determine keywords that are referred to, such personal pronouns, and the like. At block 510, the user that is the speaker or communicator of the determined and/or recognized keyword is associated with the keyword. In some embodiments, each of the recognized and/or determined keywords is extracted from the textual data.

At block 512, a sentiment is determined for each of the recognized and/or determined keywords. A sentiment analyzer, such as but not limited to sentiment analyzer 166 may be trained to determine at least a positive, negative, or neutral intent or sentiment value for the determined keywords. The sentiment analyzer may employ various sentiment analysis methods to determine the sentiment, based on the tagged textual data, at least associated with the speaker or communicator of the keyword. Various embodiments for training the sentiment analyzer are discussed in the context of FIG. 7. However, briefly here, one or more databases, such as but not limited to movie review database 134 and/or movie forum database 136 may be employed to train the sentiment analyzer. A rule-based NLP method may be employed to handle sentiments when conjunctions occur within the natural language. Process 500 may terminate and/or return a calling process.

Figure 6:
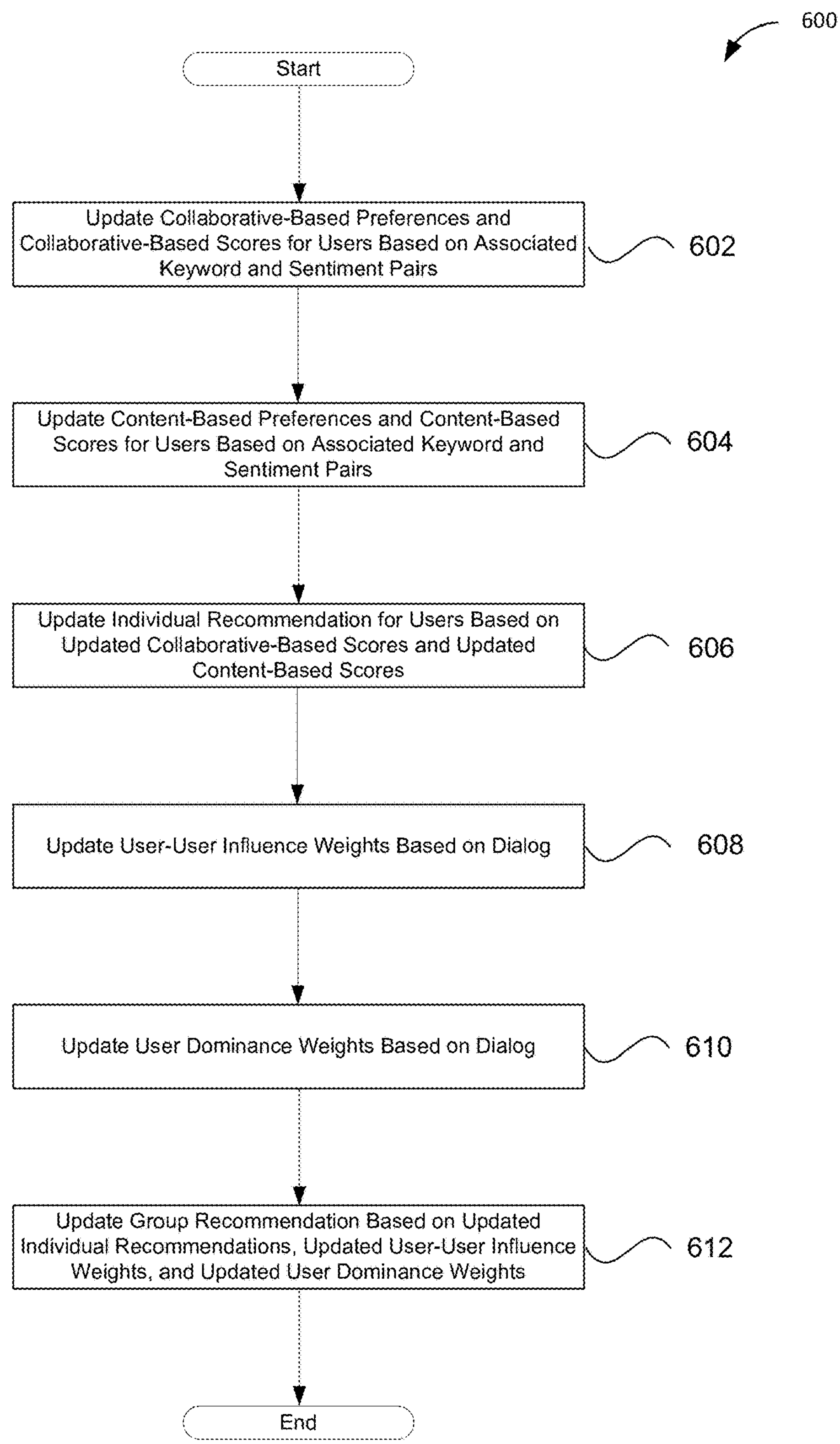
FIG. 6 illustrates one embodiment of a process flow for updating individual recommendations and group recommendations based on the group collaboration that is consistent with the various embodiments presented herein.

FIG. 6 illustrates one embodiment of a process flow for updating individual recommendations and group recommendations based on the group collaboration that is consistent with the various embodiments presented herein. Process 600 begins, after a start block, at block 602 where the collaborative-based preferences for each of the users is updated based on the keyword and sentiment pairs associated with the users.

As noted above, the collaborative-based user preferences of a particular user may include probabilities that the particular user is included in the various user-interest clusters. These probabilities may be updated based on the keyword and sentiment pairs associated with the particular user. For instance, if a particular user expresses a positive sentiment about a content-variable, such as but not limited to a particular genre of movies, the probability that the particular user is included in a user-interest group which has a high genre-score for the particular mentioned genre is increased. Similarly, if the user expresses a negative sentiment about a particular actor, the probability that the user belongs to a user-interest cluster which has a high actor-score for the particular mentioned actor is decreased. Accordingly, collaborative-based user preferences, such as but not limited to the probabilities that the user belongs to various user-interest clusters are updated based on the dialog, as indicated by the keyword and sentiment pairs associated with the user.

Furthermore, at block 602 the collaborative-based scores for each of the users may be updated based on the updated collaborative-based user preferences. Various embodiments for generating and/or updating collaborative-based scores, based on collaborative-based user preferences and the user-interest clusters are discussed in conjunction with at least process 300 of FIG. 3A.

At block 604, the content-based preferences for the users are updated based on the keyword and sentiment pairs associated with each of the users. The content-based preferences may include the content-based scores for at least a portion of the available titles. Furthermore, the content-based preferences may also include the content-variable scores, such content-variable scores for genre content-variable scores, actor content-variable scores, director content-variable scores, and the like. The content-based scores of a particular user may be updated based on the keyword and sentiment pairs associated with the particular user. For instance, if a particular user expresses a positive sentiment about an actor, then the actor content-based score for movies that are associated with the mentioned actor is increased. Similarly, when the particular user expresses a negative sentiment about a genre, then the genere content-based score for movies that are associated with the mentioned genre is decreased. In at least one embodiment, the amount of increase (or decrease) may be proportional to the previous value for the content-based score. Various embodiments for generating and/or updating content-based scores are discussed in conjunction with at least process 300 of FIG. 3A.

At block 606, the individual recommendations for each of the users are updated based on the updated collaborative-based scores and the updated content-based scores. Various embodiments for generating and/or updating individual recommendations based on collaborative-based scores and content-based scores are discussed in conjunction with at least process 300.

At block 608, the user-user influence weights are updated based on the dialog. More particularly, the user-user influence weights for each pair of users may be updated based on the keyword and sentiment pairs. Various embodiments for updating the user-user influence weights are discussed in conjunction with at least process 300.

At block 610, the user dominance weights may be updated based on the dialog. More particularly, the user dominance weights for each pair of users may be updated based on the keyword and sentiment pairs. Various embodiments for updating the user dominance weights are discussed in conjunction with at least process 300.

At block 612, the group recommendation is updated based on the updated individual recommendations, updated user-user influence scores, and the updated user dominance weights. Various embodiments for updating the group recommendation based individual recommendations, user-user influence weights, and user dominance weights is discussed in conjunction with process 300. For instance, each of the individual recommendations may be updated based on the updated user-user influence weights. In at least one embodiment, the total-individual scores are updated based on the user-user influence weights. The updated total-individual scores are combined based on the updated user dominance weights. The group scores are updated based on the combination of total-individual scores. The group recommendation may be updated based on the updated group scores. Process 600 may terminate and/or return a calling process.

FIG. 7 illustrates one embodiment of a process flow for training various embodiments presented herein. After a start block, process 700 begins at block 702 where a content-cluster analyzer, such as but not limited to content-cluster analyzer 182 of FIG. 1B, is trained. Training the content-cluster analyzer may include training a probabilistic latent semantic analyzer (pLSA) employed by the content-cluster analyzer. Training the pLSA may include decreasing the dimensionality of the semantic analysis by the introduction of one or more latent or hidden variables, as shown in FIG. 3D. Any of the typical methods for training a pLSA may be employed at block 702. In at least one embodiment, a Gaussian pLSA is assumed. An expectation-maximization (EM) method may be employed to train the Gaussian pLSA and generate a plurality of user-interest clusters, as discussed herein. Information included in databases, such as one or more of the databases included in database collection 124 may be employed to train the content-cluster analyzer.

At block 704, a collaboration-classifier analyzer, such as but not limited to content-cluster analyzer 162 of FIG. 1B, is trained. Training the collaboration-classifier may be accomplished via any supervised or unsupervised learning method that trains an analyzer to classify and/or tag parts-of-speech. According, any POS training method may be employed. In one embodiment, a gradient-boost model, implemented by the collaboration-classifier analyzer, is trained at block 704. Information included in databases, such as one or more of the databases included in database collection 124 may be employed to train the content-cluster analyzer.

At block 706, a collaboration-filter analyzer, such as but not limited to collaboration-filter analyzer 164 of FIG. 1B, is trained. The collaboration-filter analyzer may be trained with three or more states. For instance, a Hidden Markov model filter may be trained with inside, outside, and beginning states (IOB) to remove noise in classifier and/or tagging via a chunk model. In one embodiment, a biagram model is employed to determine the probability of POS tags occurring in the training states. Transition probabilities may be trained via information included in databases, such as one or more of the databases included in database collection 124.

At block 708, a sentiment analyzer, such as but not limited to sentiment analyzer 166 of FIG. 1B. The sentiment analyzer may include a sentiment classifier. The sentiment analyzer or classifier may be trained via a sentiment dataset. For instance, movie forum database 136 may be employed as a sentiment dataset. The sentiment analyzer may be a naïve sentiment analyzer. That is, a naïve Bayesian classifier may be employed in the sentiment analyzer.

Figure 8:
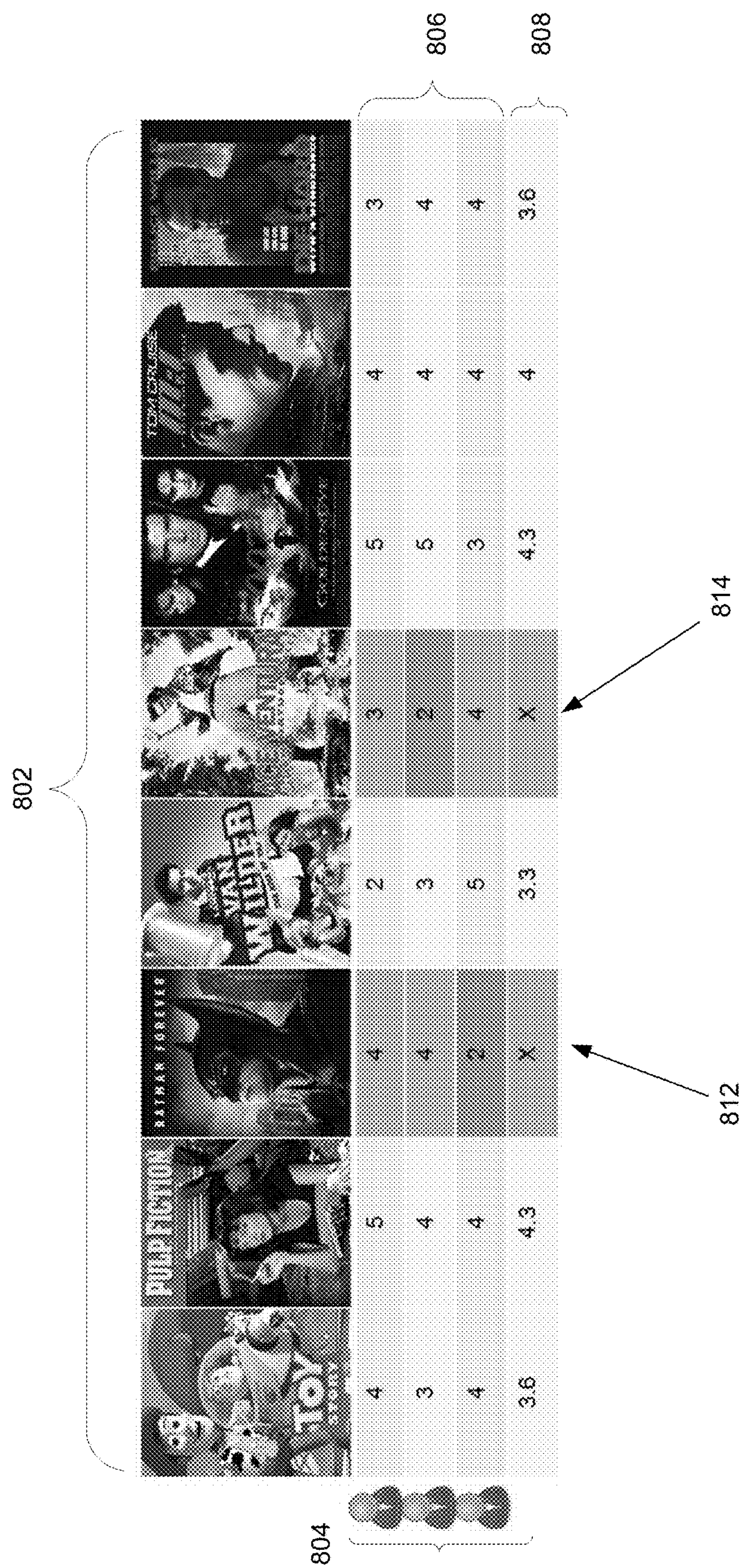
FIG. 8 illustrates individual and group recommendations for a user group of three users generated by a non-limiting exemplary embodiment.

FIG. 8 illustrates individual and group recommendations for a user group 804 of three user generated by a non-limiting exemplary embodiment. The set of available content 802 includes eight movie titles, represented by the eight columns in the data table. The rows labeled 806 show the total-individual scores for each of the three users for each of the eight movies. The row labeled 808 shows the group score for each of the eight movies. The two movies represented by the columns marked as 812 and 814 have been filtered out of the group recommendation. For instance, the filter threshold of the "average without misery" filter, discussed in conjunction with at least block 320 of FIG. 3A, may be set to a value of 2.5. Such a filter threshold filters out the movies in column 812 and 814.

Illustrative Computing Device

Figure 9:
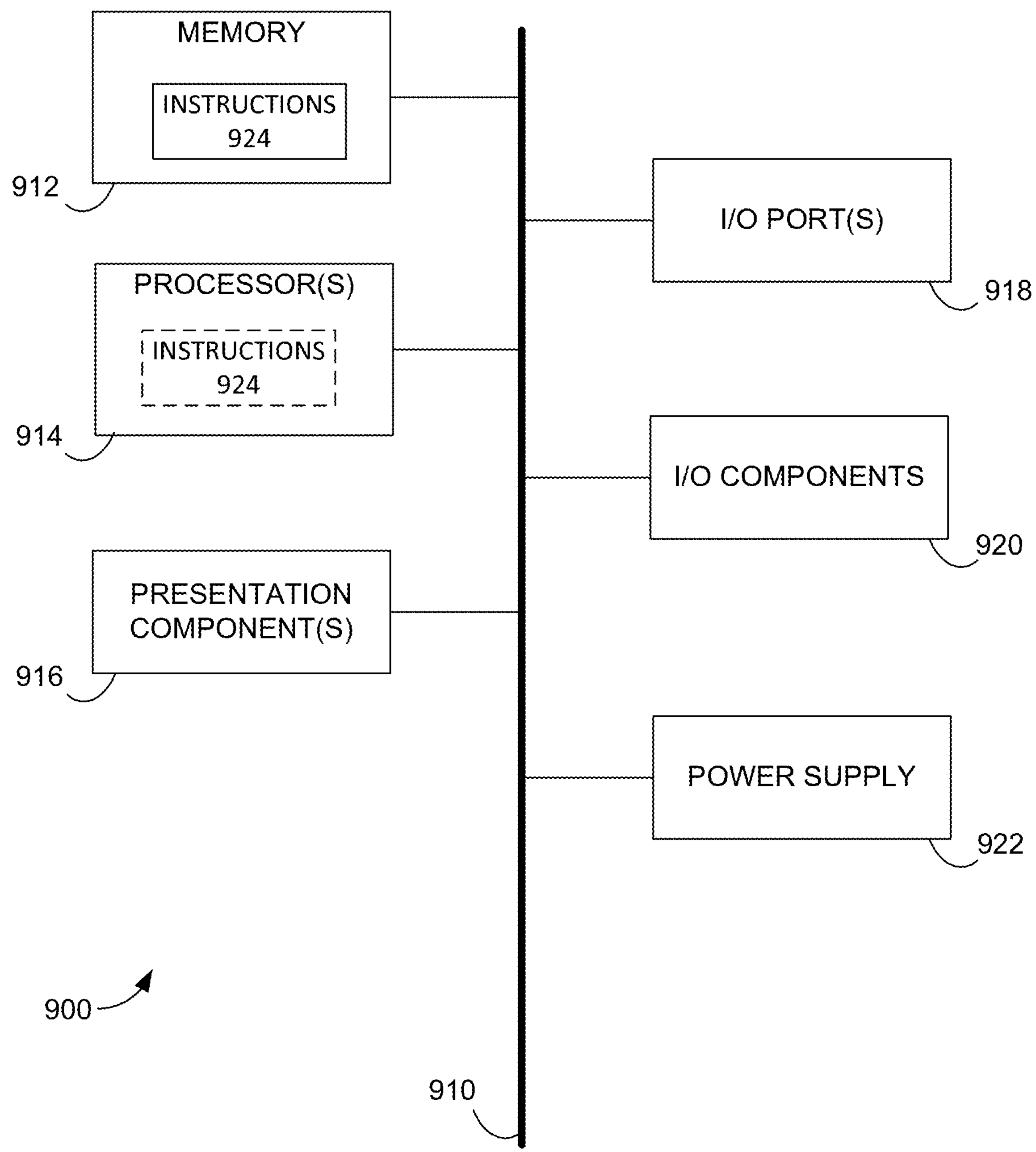
FIG. 9 is a block diagram of an example computing device in which embodiments of the present disclosure may be employed.

Having described embodiments of the present invention, an example operating environment in which embodiments of the present invention may be implemented is described below in order to provide a general context for various aspects of the present invention. Referring to FIG. 9, an illustrative operating environment for implementing embodiments of the present invention is shown and designated generally as computing device 900. Computing device 900 is but one example of a suitable computing environment and is not intended to suggest any limitation as to the scope of use or functionality of the invention. Neither should the computing device 900 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a smartphone or other handheld device. Generally, program modules, or engines, including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialized computing devices, etc. Embodiments of the invention may also be practiced in distributed computing environments where tasks are performed by remote-processing devices that are linked through a communications network.

With reference to FIG. 9, computing device 900 includes a bus 910 that directly or indirectly couples the following devices: memory 912, one or more processors 914, one or more presentation components 916, input/output ports 918, input/output components 920, and an illustrative power supply 922. Bus 910 represents what may be one or more busses (such as an address bus, data bus, or combination thereof). Although the various blocks of FIG. 9 are shown with clearly delineated lines for the sake of clarity, in reality, such delineations are not so clear and these lines may overlap. For example, one may consider a presentation component such as a display device to be an I/O component, as well. Also, processors generally have memory in the form of cache. We recognize that such is the nature of the art, and reiterate that the diagram of FIG. 9 is merely illustrative of an example computing device that can be used in connection with one or more embodiments of the present disclosure. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer storage media in the form of volatile and/or nonvolatile memory. Memory 912 may be non-transitory memory. As depicted, memory 912 includes instructions 924. Instructions 924, when executed by processor(s) 914 are configured to cause the computing device to perform any of the operations described herein, in reference to the above discussed figures, or to implement any program modules described herein. The memory may be removable, non-removable, or a combination thereof. Illustrative hardware devices include solid-state memory, hard drives, optical-disc drives, etc. Computing device 900 includes one or more processors that read data from various entities such as memory 912 or I/O components 920. Presentation component(s) 916 present data indications to a user or other device. Illustrative presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A non-transitory computer-readable storage medium having instructions stored thereon for recommending content to a group including a plurality of users that are communicatively coupled by a network, which, when executed by a processor of a computing device cause the computing device to perform actions comprising:

generating respective content recommendations for the plurality of users;

generating a group content recommendation that indicates a first subset of content that is based on the respective content recommendations for the plurality of users, wherein the first subset of content includes a plurality of content-variables associated with the first subset of content;

providing the group content recommendation, by the network, to each of the plurality of users;

monitoring real-time dialog that includes a discussion between at least a first user and a second user of the plurality of users, wherein the real-time dialog is responsive to and based on the group content recommendation and is transmitted by the network, and the discussion is related to the group content recommendation;

analyzing the real-time dialog to identify a keyword included in the real-time dialog based on a relevancy of the keyword to the first subset of content indicated by the group content recommendation, wherein the relevancy of the keyword is based on determining the keyword corresponds to at least one of the plurality of content-variables associated with the first subset of content;

updating the group content recommendation based on the keyword identified from the real-time dialog such that the updated group content recommendation indicates a second subset of the content; and providing the updated group content recommendation, by the network, to the plurality of users.

2. The computer-readable storage medium of claim 1, wherein the actions further comprise:

determining a sentiment for the keyword, wherein the sentiment for the keyword includes an intent that is directed at a portion of the content and the keyword is associated with the portion of the content;

updating the group content recommendation further based on the sentiment for the keyword such that a group ranking of the portion of the content is updated based on the intent.

3. The computer-readable storage medium of claim 1, wherein the actions further comprise:

generating collaborative-based scores for the content for the first user based on user-interest clusters and collaborative-based preferences included in user preferences of the first user;

generating content-based scores for the content for the first user based on content-based preferences included in the user preferences of the first user; and generating a first ranking of the content based on a combination of the collaborative-based scores and the content-based scores, wherein the first ranking of the content is included in an individual content recommendation for the first user.

4. The computer-readable storage medium of claim 1, wherein the actions further comprise:

updating a first ranking of the content included in an individual content recommendation for the first user based on a first influence weight and a second ranking of the content included in an individual content recommendation for the second user, wherein the first influence weight is associated with each of the first user and the second user;

updating the second ranking of the content based on a second influence weight and the first ranking of the content, wherein the second influence weight is associated with each of the first user and the second user;

generating a group ranking of the content included in the group content recommendation based on a combination of the updated first and second rankings of the content; and generating the group content recommendation based on the group ranking and a filter threshold, wherein when a score, included in at least one of the updated first or second rankings, for a first portion of the content is less than the filter threshold, the group content recommendation does not include the first portion of the content.

5. The computer-readable storage medium of claim 1, the actions further comprise:

receiving, by the network, audio data of the real-time dialog;

generating textual data, based on the audio data, of the real-time dialog;

determining the keyword included in the real-time dialog based on the textual data and a database associated with the content;

determining a sentiment for the keyword based on the textual data and linguistic heuristics; and updating the group content recommendation further based on the sentiment for the keyword.

6. The computer-readable storage medium of claim 1, wherein the actions further comprise:

determining a first keyword associated with the first user that corresponds to a first portion of the content;

determining a first sentiment associated with the first keyword;

updating a content-based score for the content for the first user based on the first sentiment associated with the first keyword;

updating a collaborative-based score for the content for the first user based on the first sentiment associated with the first keyword;

updating a first ranking of the content based on each of the updated content-based score and the collaborative-based score of the content for the first user; and updating the group content recommendation based on the updated first ranking of the content.

7. The computer-readable storage medium of claim 1, the actions further comprise:

determining a group consensus based on the real-time dialog; and in response to the group consensus, providing a portion of the content associated with the group consensus to each of the plurality of users.

8. A method for recommending content to a group that includes a plurality of users, comprising:

steps for providing, over a network, a group recommendation that indicates a first subset of content to each of the plurality of users, wherein the group recommendation is based on user preferences of each of the plurality of users, and wherein the first subset of content includes a plurality of content-variables associated with the first subset of content;

steps for monitoring a collaboration of the plurality of users that includes a real-time dialog that includes a discussion between a first user and a second user of the plurality of users that is in response to and based on being provided the group recommendation, wherein the real-time dialog is transmitted by the network, and the discussion is related to the group recommendation;

steps for updating the group recommendation based on identifying a keyword included in the real-time dialog based on a relevancy of the keyword to the first subset of content indicated by the group recommendation, wherein the relevancy of the keyword is based on determining the keyword corresponds to at least one of the plurality of content-variables associated with the first subset of content; and steps for providing, over the network, the updated group recommendation to each of the plurality of users, wherein the updated group recommendation is based on the keyword identified from the real-time dialog such that the updated group recommendation indicates a second subset of the content.

9. The method for claim 8, further comprising:

steps for generating respective individual recommendations for the plurality of users, wherein an individual recommendation for the first user of the plurality of users is based on user preferences of the first user;

steps for generating the group recommendation based on the respective recommendations for the plurality of users;

steps for determining keyword and sentiment pairs based on the real-time dialog; and steps for updating the group recommendation based on the keyword and sentiment pairs.

10. The method of claim 9, wherein steps for generating an individual recommendation for the first user include:

generating collaborative-based scores for the content based on a plurality of user-interest clusters and collaborative-based preferences included in the user preferences of the first user;

generating content-based scores for the content based on content-based preferences included in the user preferences of the first user;

generating a first ranking of the content based on a combination of the collaborative-based scores and the content-based scores for the content; and generating the individual recommendation for the first user based on the first ranking of the content.

11. The method of claim 9, wherein the steps for generating the group recommendation include:

generating a plurality of user-user influence weights based on the real-time dialog;

updating a ranking for the content included in the individual recommendation for each of the plurality of users based on the plurality of user-user influences weights;

filtering the respective recommendations for the plurality of users based on the updated rankings for the content and a filter threshold; and generating the group recommendation based on a combination of the filtered respective recommendations for the plurality of users.

12. The method of claim 9, wherein the steps for generating the group recommendation include:

determining a plurality of dominance weights based on at least one of a speaking frequency or a referenced frequency, associated with the real-time dialog, for each of the plurality of users; and determining a combination of the respective recommendations for the plurality of users based on the plurality of dominance weights; and generating the group recommendation based on the combination of the respective recommendations for the plurality of users.

13. The method of claim 9, wherein the steps for determining the keyword and sentiment pairs include:

receiving textual data of the real-time dialog;

tagging the textual data based on an Inside, Outside, or Beginning format;

determine a keyword included in the real-time dialog based on the textual data and a content database; and determine a sentiment associated with the keyword.

14. The method of claim 8, wherein the steps for updating the group recommendation include:

updating collaborative-based scores for the content that based on the keyword and sentiment pairs based on the real-time dialog;

updating content-based scores for the content based on the keyword and sentiment pairs;

update respective recommendations for the plurality of users based on the updated collaborative-based scores and the updated content-based scores for the content; and updating the group recommendation based on the respective recommendations for the plurality of users.

15. A computing system for recommending content to a group that includes a plurality of users, comprising:

a network that communicatively couples each of the plurality of users; a processor device; and a computer-readable storage medium, coupled with the processor device, having instructions stored thereon, which, when executed by the processor device, provide the system with a recommendation engine configured to perform actions comprising:

for the plurality of users, generating respective recommendations based on a combination of collaborative-based scores for the content and content-based user scores for the content;

generating a group recommendation that indicates a first subset of content based on a combination of the respective recommendations for the plurality of users, wherein the first subset of content includes a plurality of content-variables associated with the first subset of content;

providing the group recommendation, by the network, to each of the plurality of users;

employing the network to monitor a group collaboration that includes a real-time dialog that includes a discussion between a first user and a second user of the plurality of users that is in response to and based on being provided the group recommendation, and the discussion is related to the group recommendation;

updating the group recommendation based on identifying a keyword included in the real-time dialog based on a relevancy of the keyword to the first subset of content indicated by the group recommendation, wherein the relevancy of the keyword is based on determining the keyword corresponds to at least one of the plurality of content-variables associated with the first subset of content; and employing the network to provide the updated group recommendation to each of the plurality of users, wherein the updated group recommendation is based on the keyword identified from the real-time dialog such that the updated group recommendation indicates a second subset of the content.

16. The computing system of claim 15, the actions further comprising:

determining the keyword included in the real-time dialog, wherein the keyword is associated with the content; and determining a sentiments, wherein the sentiment corresponds to the keyword;

for each of the plurality of users, updating the collaborative-based scores for the content based on the keyword and the sentiment;

for each of the plurality of users, updating the content-based scores for the content based on the keyword and the sentiment; and for each of the plurality of users, updating the individual recommendation based on the updated collaborative-based scores for the content and the content-based scores for the content.

17. The computing system of claim 15, the actions further comprising:

updating a plurality of user-user influence weights based on the real-time dialog; and for each of the plurality of users, updating a ranking of the content included in the individual recommendation based on the updated user-user influence weights; and updating the group recommendation based on the updated ranking of the content for each of the plurality of users and a consensus function.

18. The computing system of claim 15, the actions further comprising:

in response to detecting a group consensus included in the real-time dialog, determining a portion of the content associated with the group consensus; and employing the network to provide the portion of the content to each of the plurality of users.

19. The computing system of claim 15, the actions further comprising:

determining a first keyword associated with the first user that is included in a first portion of the real-time dialog, wherein the first keyword indicates a first portion of the content;

determining a first sentiment associated with the first keyword based on the first portion of the content, wherein the first sentiment indicates one of a positive intent or a negative intent of the first user for the first portion of the content;

updating a ranking of the first portion of the content for the first user based on the first sentiment; and updating the group recommendation based on the updated ranking of the first portion of the content for the first user.

20. The computing system of claim 15, wherein collaborative-based scores for the content for the first user of the plurality of users are based on a probability that the first user is included in a user-interest cluster and a plurality of scores for the content associated with the user-interest cluster, wherein the probability that the first user is included in the user-interest cluster is based on a content-consumption history of the first user.

* * * * *

UNITED STATES PATENT AND TRADEMARK OFFICE

CERTIFICATE OF CORRECTION

PATENT NO. : 10,932,004 B2
APPLICATION NO. : 15/414366
DATED : February 23, 2021
INVENTOR(S) : Sumit Shekhar et al.

It is certified that error appears in the above-identified patent and that said Letters Patent is hereby corrected as shown below:

In the Claims

In Column 27, Line 45, Claim 9, after “respective” delete “individual”.

Signed and Sealed this
First Day of June, 2021

Drew Hirshfeld
*Performing the Functions and Duties of the*
*Under Secretary of Commerce for Intellectual Property and*
*Director of the United States Patent and Trademark Office*